United States Patent
Jang et al.

(10) Patent No.: US 12,478,446 B2
(45) Date of Patent: Nov. 25, 2025

(54) MAGNETIC DRIVE SYSTEM AND MICROROBOT CONTROL METHOD

(71) Applicant: IUCF-HYU (INDUSTRY-UNIVERSITY COOPERATION FOUNDATION HANYANG UNIVERSITY), Seoul (KR)

(72) Inventors: Gunhee Jang, Seoul (KR); Wonseo Lee, Seoul (KR); Eunsoo Jung, Seoul (KR); Nahyun Kim, Busan (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 926 days.

(21) Appl. No.: 17/629,953

(22) PCT Filed: Jul. 17, 2020

(86) PCT No.: PCT/KR2020/009482
§ 371 (c)(1),
(2) Date: Jan. 25, 2022

(87) PCT Pub. No.: WO2021/020784
PCT Pub. Date: Feb. 4, 2021

(65) Prior Publication Data
US 2022/0249186 A1    Aug. 11, 2022

(30) Foreign Application Priority Data

Jul. 26, 2019  (KR) .................. 10-2019-0090842
Jul. 3, 2020   (KR) .................. 10-2020-0082227

(51) Int. Cl.
*H01F 7/20*    (2006.01)
*A61B 34/00*   (2016.01)
*A61B 34/30*   (2016.01)

(52) U.S. Cl.
CPC ............... *A61B 34/73* (2016.02); *H01F 7/20* (2013.01); *A61B 2034/303* (2016.02); *A61B 2034/732* (2016.02)

(58) Field of Classification Search
CPC .............. A61B 34/73; A61B 2034/303; A61B 2034/732; A61B 34/10; A61B 34/32;
(Continued)

(56) References Cited

U.S. PATENT DOCUMENTS

| | | | | |
|---|---|---|---|---|
| 6,148,823 | A * | 11/2000 | Hastings | A61B 34/70 128/897 |
| 6,330,467 | B1 * | 12/2001 | Creighton, IV | A61B 1/00158 600/407 |
| 2007/0270628 | A1 * | 11/2007 | Kawano | A61B 34/73 600/12 |
| 2008/0183071 | A1 * | 7/2008 | Strommer | A61B 5/062 382/128 |

(Continued)

FOREIGN PATENT DOCUMENTS

| | | | |
|---|---|---|---|
| CN | 101849814 B | * | 12/2012 |
| CN | 103169443 A | * | 6/2013 |

(Continued)

OTHER PUBLICATIONS

International Search Report for PCT/KR2020/009482 dated, Oct. 26, 2020 (PCT/ISA/210).

*Primary Examiner* — Alex M Valvis
*Assistant Examiner* — Julie Thi Tran
(74) *Attorney, Agent, or Firm* — Sughrue Mion, PLLC

(57) ABSTRACT

A magnetic drive system is disclosed. The magnetic drive system comprises: a first magnetic field generation unit; a second magnetic field generation unit which is disposed under the first magnetic field generation unit in a Z-axis direction with an operation area interposed therebetween, (Continued)

and generates a magnetic field in the operation area in combination with the first magnetic field generation unit; and a moving module for moving at least one of the first magnetic field generation unit and the second magnetic field generation unit.

15 Claims, 26 Drawing Sheets

(58) Field of Classification Search
CPC ... A61B 50/13; A61B 90/50; A61B 2034/731; A61B 2090/376; A61B 34/30; A61B 17/00; A61B 34/20; A61B 34/35; A61B 2017/00398; A61B 2017/00778; A61B 2034/2051; H01F 7/20; B25J 9/0087; B25J 18/00; B25J 13/006; A61M 25/0127; H02K 33/18; A61N 2/02; A61N 2/06; A61N 2/12
See application file for complete search history.

(56) References Cited

U.S. PATENT DOCUMENTS

| | | | |
|---|---|---|---|
| 2016/0262841 | A1 | 9/2016 | Park et al. |
| 2018/0084976 | A1* | 3/2018 | Duan .................. A61B 5/062 |

FOREIGN PATENT DOCUMENTS

| CN | 103222842 A | * | 7/2013 | ......... A61B 1/00006 |
|---|---|---|---|---|
| JP | 2003-52676 A | | 2/2003 | |
| JP | 2003052676 A | * | 2/2003 | ........... A61B 6/4452 |
| JP | 2005-103091 A | | 4/2005 | |
| KR | 10-2004-0108277 A | | 12/2004 | |
| KR | 10-1647020 B1 | | 8/2016 | |
| KR | 10-1720032 B1 | | 3/2017 | |
| KR | 10-1740553 B1 | | 5/2017 | |
| KR | 1740553 B1 | * | 5/2017 | ............. A61B 34/30 |
| KR | 10-2019-0043779 A | | 4/2019 | |
| KR | 10-2019-0052125 A | | 5/2019 | |
| KR | 10-2020-0063942 A | | 6/2020 | |

* cited by examiner

MAGNETIC DRIVE SYSTEM AND MICROROBOT CONTROL METHOD

TECHNICAL FIELD

The present invention relates to a magnetic drive system and a microrobot control method using the same, and more particularly, to a magnetic drive system capable of controlling movements of a magnetic robot.

BACKGROUND ART

A magnetic robot equipped therein with a magnet is driven after receiving magnetic torque and magnetic force by an external magnetic field generated from a magnetic drive system, and the magnetic robot is precisely controllable remotely, so its application and R&D are in progress in various sites. Typically, there are a magnetically driven capsule endoscope applied to the digestive system, a magnetic catheter applied to the treatment of cardiac arrhythmias, and the like. In addition, there are a vascular therapeutic magnetic robot for occlusive vascular treatment, a microrobot for intraocular drug delivery, magnetic nanoparticles for targeted drug delivery in tissues, and the like.

As in the above, positions of the body part and the lesion part to which the magnetic robot is applied are very various. The core of driving and controlling the magnetic robot is a magnetic drive system that generates an external magnetic field. However, the conventional magnetic drive systems fail to consider the position and characteristics of a lesion due to fixed position and arrangement of an electromagnet that generates a magnetic field, and accordingly have inefficiently generated and controlled the magnetic field. In addition, since the magnetic drive system is very heavy and has a large volume, there are great restrictions on storage and placement. The limitations of the magnetic field drive system lead to limitations on diseases applicable to the magnetic robot and available motions.

DISCLOSURE

Technical Problem

The present invention provides a magnetic drive system for optimizing a position and a size of an operation area according to the lesion.

In addition, the present invention provides a magnetic drive system for coming into close contact with the body to track movements of a microrobot.

In addition, the present invention provides a microrobot control method for tracking and controlling movements of a microrobot by using a magnetic drive system.

Technical Solution

A magnetic drive system according to the present invention includes: a first magnetic field generation unit; a second magnetic field generation unit disposed under the first magnetic field generation unit in a Z-axis direction with an operation area interposed therebetween to generate a magnetic field in the operation area in combination with the first magnetic field generation unit; and a moving module for moving at least one of the first magnetic field generation unit and the second magnetic field generation unit.

In addition, the first magnetic field generation unit may include: a ring-shaped first back yoke; a first core coupled to the first back yoke; and a first coil wound on the first core, and the second magnetic field generation unit may include: a ring-shaped second back yoke; a second core coupled to the second back yoke; and a second coil wound on the second core.

In addition, the moving module may move the first magnetic field generation unit and the second magnetic field generation unit, so that a central axis of the first back yoke is positioned on a line identical to a central axis of the second back yoke.

In addition, the moving module may adjust a distance between the first back yoke and the second back yoke in a direction of the central axis.

In addition, the moving module may include: a body having a support shaft; a rotating arm coupled to the support shaft and rotatable about the support shaft; a pair of connecting arms mounted on a front end of the rotating arm, and rotatable about the first axis, respectively; a first support arm mount on a front end of one of the connecting arms, and rotatable with respect to the connecting arm about a second axis parallel to the first axis to support the first back yoke; and a second support arm mount on a front end of a remaining one of the connecting arms, and rotatable with respect to the connecting arm about a third axis parallel to the first axis to support the second back yoke.

In addition, the rotating arm may include a first area coupled to the support shaft; and a second area connecting the first area to the connecting arms and rotatable with respect to the first area about the second axis parallel to a longitudinal direction of the rotating arm.

In addition, the first back yoke and the second back yoke may have the same outer diameter.

In addition, the first back yoke may have an outer diameter greater than an outer diameter of the second back yoke, and have a sectional area greater than a sectional area of the second back yoke, and the first core may have a sectional area larger than a sectional area of the second core.

In addition, the present invention may further include: a control unit that obtains a position information of a target positioned within the operation area, and controls the moving module so that the central axis of the first back yoke and the central axis of the second back yoke are positioned on a line same with the target.

In addition, the first back yoke may be coupled to the first core via a pin, and the second back yoke may be coupled to the first second via a pin, in which the first back yoke and the second back yoke may be rotatable about the pins, respectively.

In addition, the first magnetic field generation unit may include: a first upper yoke; a second upper yoke spaced apart from the first upper yoke at a same height; first and second upper cores spaced apart from each other so as to be coupled to the first upper yoke; third and fourth upper cores spaced apart from each other so as to be coupled to the second upper yoke; and upper coils wound around the first to fourth upper cores, respectively, the second magnetic field generation unit may include: a first lower yoke disposed under the first upper yoke in the Z-axis direction; a second lower yoke disposed under the second upper yoke in the Z-axis direction; first and second lower cores spaced apart from each other so as to be coupled to the first lower yoke; third and fourth lower cores spaced apart from each other so as to be coupled to the second upper yoke; and lower coils wound around the first to fourth lower cores, respectively, in which one area of each of the first to fourth upper cores and one area of each of the first to fourth lower cores may be arranged toward the operation area.

In addition, the first magnetic field generation unit may further include plate-shaped upper core tips coupled to front ends of the first to fourth upper cores, respectively, and formed of magnetic materials, and the second magnetic field generation unit may further include plate-shaped lower core tips coupled to front ends of the first to fourth lower cores, respectively, and formed of magnetic materials.

In addition, when viewed in the Z-axis direction, an edge area of the upper core tip may be positioned on a line same as edge areas of the upper coils, and an edge area of the lower core tip may be positioned on a line same as edge areas of the lower coils.

In addition, one area of each of the first to fourth upper cores may be arranged toward a center of the operation area.

In addition, the mobile module may include: a vertical moving module for relatively and linearly moving the first upper yoke and the second upper yoke with respect to the first lower yoke and the second lower yoke in the Z-axis direction; and a horizontal moving module for linearly moving the first upper yoke and the first lower yoke integrally, or linearly moving the second upper yoke and the second lower yoke integrally, so as to change the distance in the Y-axis direction of the second upper yoke and the second lower yoke with respect to the first upper yoke and the first lower yoke.

In addition, the horizontal moving module may linearly move the first upper yoke and the first lower yoke in the X-axis direction integrally, and linearly move the second upper yoke and the second lower yoke in the X-axis direction integrally.

In addition, the present invention further includes: a first vertical yoke having a lower end coupled to a rear end of the first lower yoke and an upper end positioned at a rear of the first upper yoke; and a second vertical yoke having a lower end coupled to a rear end of the second lower yoke and an upper end positioned at a rear of the second upper yoke, wherein the vertical moving module may include: a first vertical support shaft positioned at a rear of the first vertical yoke, having a longitudinal direction provided in the Z-axis direction, and provided on at least one surface thereof with a first guide rail; a second vertical support shaft positioned at a rear of the second vertical yoke, disposed in parallel with the first vertical support shaft, and provided on at least one surface thereof with a second guide rail; a first yoke support plate movable along the first guide rail, and having a front end coupled to the first upper yoke; and a second yoke support plate movable along the second guide rail, and having a front end coupled to the second upper yoke.

In addition, each of the first to fourth upper cores and the first to fourth lower cores may be configured such that a plurality of steel sheets with a same size are stacked in a width direction thereof.

Advantageous Effects

According to the present invention, the first magnetic field generation unit and the second magnetic field generation unit generate the operation area with the lesion interposed therebetween, and the distance between the first magnetic field generation unit and the second magnetic field generation unit is adjusted by the moving module, so that the operation area can be optimized for the lesion.

In addition, according to the present invention, the first magnetic field generation unit and the second magnetic field generation unit are in close contact with the body by driving the moving module, and the first magnetic field generation unit and the second magnetic field generation unit are moved according to the movement of the microrobot, so that the operation area can be shifted while tracking the movement of the microrobot.

In addition, according to the present invention, the operation area is shifted along the movement path of the microrobot, so that the microrobot can be controlled continuously in real time.

BEST MODE

A magnetic drive system according to the present invention includes: a first magnetic field generation unit; a second magnetic field generation unit disposed under the first magnetic field generation unit in a Z-axis direction with an operation area interposed therebetween to generate a magnetic field in the operation area in combination with the first magnetic field generation unit; and a moving module for moving at least one of the first magnetic field generation unit and the second magnetic field generation unit.

Mode for Invention

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification, when one component is mentioned as being on another component, it signifies that the one component may be placed directly on another component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components should not be limited by the terms. The above terms are used merely to distinguish one component from another component. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Figure 1:
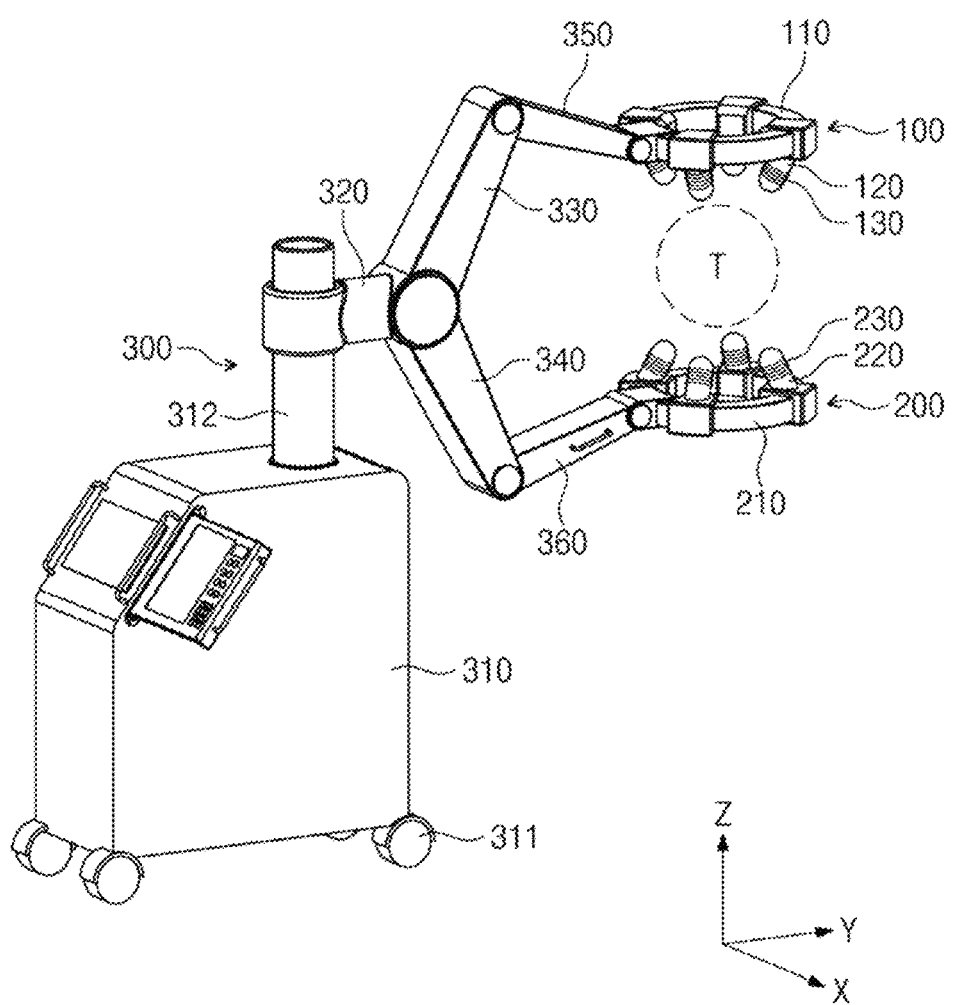
FIG. 1 is a perspective view showing a magnetic drive system according to one embodiment of the present invention.
Figure 2:
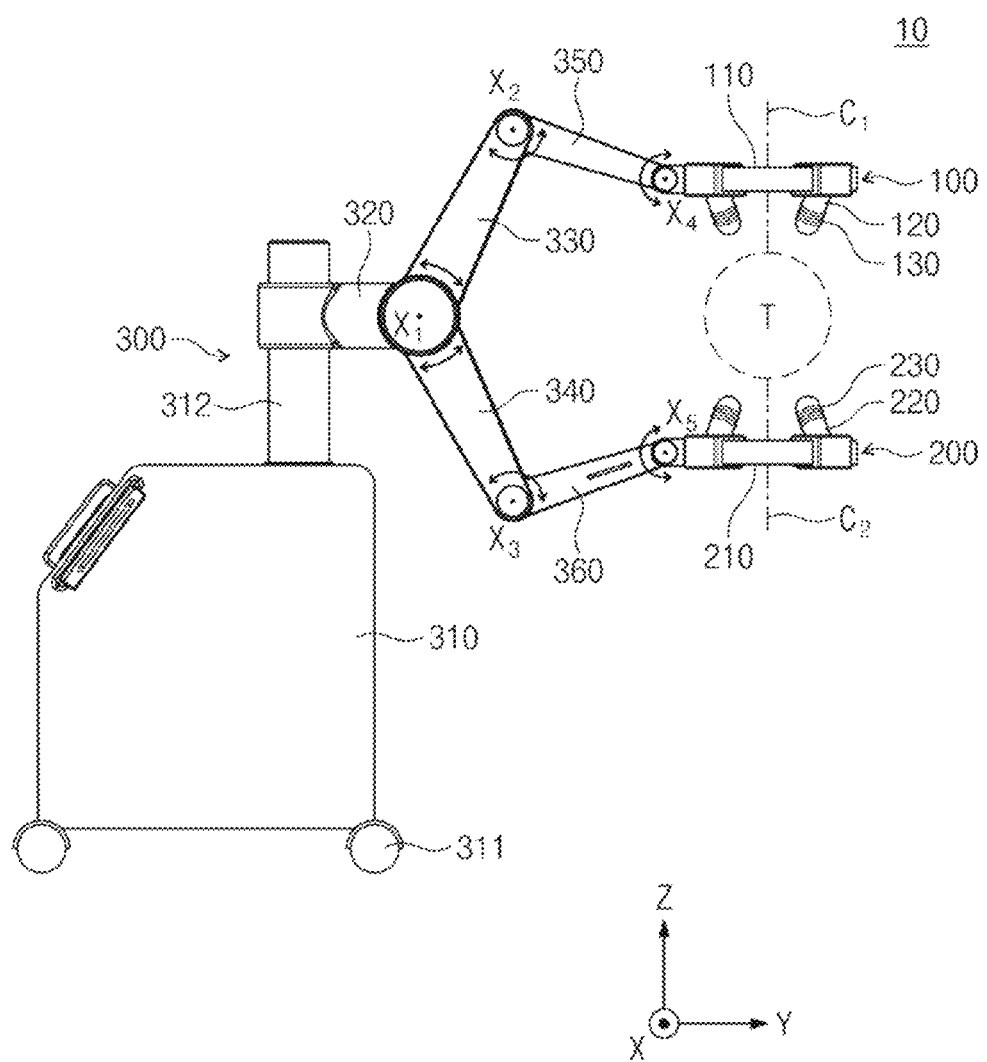
FIG. 2 is a front view showing the magnetic drive system of FIG. 1.

FIG. 1 is a perspective view showing a magnetic drive system according to one embodiment of the present invention. FIG. 2 is a front view showing the magnetic drive system of FIG. 1.

Referring to FIGS. 1 and 2, a magnetic drive system 10 includes a first magnetic field generation unit 100, a second magnetic field generation unit 200, a mobile module 300, and a control unit (not shown).

The first magnetic field generation unit 100 and the second magnetic field generation unit 200 are disposed to face each other with the operation area T interposed therebetween, and generate a magnetic field in the operation area T. Hereinafter, for convenience of description, an arrangement direction of the first magnetic field generation unit 100 and the second magnetic field generation unit 200 is referred to as a Z-axis direction, and directions perpendicular thereto are referred to as an X-axis direction and a Y-axis direction.

The moving module 300 supports and moves the first magnetic field generation unit 100 and the second magnetic field generation unit 200. The moving module 300 moves the first magnetic field generation unit 100 and the second magnetic field generation unit 200 along a target positioned in the operation area T.

The control unit controls movements of the moving module 300.

The first magnetic field generation unit 100 includes a first back yoke 110, a first core 120, and a first coil 130.

The first back yoke 110 has a ring shape, and is formed with an inner space having open upper and lower surfaces. The first back yoke 110 may have a circular or polygonal ring shape. The first back yoke 110 may be formed of a magnetic material. The first back yoke 110 may have a central axis positioned at a center of the inner space so as to be perpendicular to the ground.

The first core 120 is supported on the first back yoke 110. The first core 120 may be formed of a magnetic material. The first core 120 may have a cylindrical or polygonal shape, and may be inclined at a predetermined angle toward the central axis C1 of the first back yoke 110. At least two first cores 120 are provided. According to the embodiment, four first cores 120 are provided. The first core 120 may be arranged at equal intervals along a circumference of the first back yoke 110. Ends of the first cores 120 may face the operation area.

The first coil 130 is wound on each of the first cores 120. The first coil 130 generates a magnetic field upon application of an electric current.

The second magnetic field generation unit 200 includes a second back yoke 210, a second core 220, and a second coil 230.

The second back yoke 210 may have the same shape as the first back yoke 110. The second back yoke 210 is spaced apart from the first back yoke 110 by a predetermined distance to face the first back yoke 110. The second back yoke 210 has a central axis C2 positioned in the inner space so as to be positioned on the same line as the central axis C1 of the first back yoke 110.

The second core 220 is supported on the second back yoke 210. The second core 220 may be formed of a magnetic material. The second core 220 may have the same shape as the first core 120, and may be inclined at a predetermined angle toward the central axis C2 of the second back yoke 210. The second core 220 is provided in the same number as the first core 120. The second cores 220 may be arranged at equal intervals along a circumference of the second back yoke 210. The second cores 220 may be disposed to face the first cores 120, respectively.

The second coil 230 is wound on each of the second cores 220. The second coil 230 generates a magnetic field upon application of an electric current.

The moving module 300 includes a body 310, a rotating arm 320, a pair of connecting arms 330 and 340, a first support arm 350, and a second support arm 360.

The body 310 is a body of the moving module 300, in which various electronic components are installed. A plurality of wheels 311 are mounted on a bottom surface of the body 310 to facilitate movements. A support shaft 312 is provided on the top of the body 310. The support shaft 312 is provided at a predetermined height in the Z-axis direction.

The rotating arm 320 has a rear end mounted on the support shaft 312, and is rotatable about the support shaft 312.

The connecting arms 330 and 340 are provided in pair, and rear ends are coupled to front ends of the rotating arm 320, respectively. The connecting arms 330 and 340 are rotatable with respect to the rotating arm 320 about a first axis X1 perpendicular to the Z axis. The pair of connecting arms 330 and 340 are individually rotatable with respect to the rotating arm 320. The angle between the connecting arms 330 and 340 may be changed depending on rotation angles of the connecting arms 330 and 340.

The first support arm 350 has one end coupled to a front end of any one of the connecting arms 330. The first support arm 350 is relatively rotatable with respect to the connecting arm 330 about a second axis X2 parallel to the first axis X1. The other end of the first support arm 350 is coupled to the first back yoke 110. The other end of the first support arm 350 is coupled to the first back yoke 110 so that the first back yoke 110 is rotatable about an axis X4 parallel to the first axis X1.

The second support arm 360 has one end coupled to a front end of the other connecting arm 340. The second support arm 360 is relatively rotatable with respect to the connecting arm 320 about a third axis X3 parallel to the first axis X1. The other end of the second support arm 360 is coupled to the second back yoke 210. The other end of the second support arm 360 is coupled to the second back yoke 210 so that the second back yoke 210 is rotatable about an axis X5 parallel to the first axis X1.

The above-described drive of the moving module 300 enables the movements of the first magnetic field generation unit 100 and the second magnetic field generation unit 200. Specifically, when the rotating arm 320 is rotated about the Z axis, the first magnetic field generation unit 100 and the second magnetic field generation unit 200 may be rotated in a lateral direction on an XY plane parallel to the ground. In addition, a distance between the first magnetic field generation unit 100 and the second magnetic field generation unit 200 may be adjusted toward the central axes C1 and C2 of the first and second back yokes 110 and 210 by rotating the connecting arms 330 and 340 about the first axis X1, rotating the first support arm 350 about the second axis X2, and rotating the second support arm 340 about the third axis X3. In this case, the first back yoke 110 and the second back yoke 210 may be moved so that the central axes C1 and C2 are positioned on the same line. The size of the operation area T and the strength of the magnetic field in the operation area T may be adjusted according to the distance between the first magnetic field generation unit 100 and the second magnetic field generation unit 200.

Figure 3:
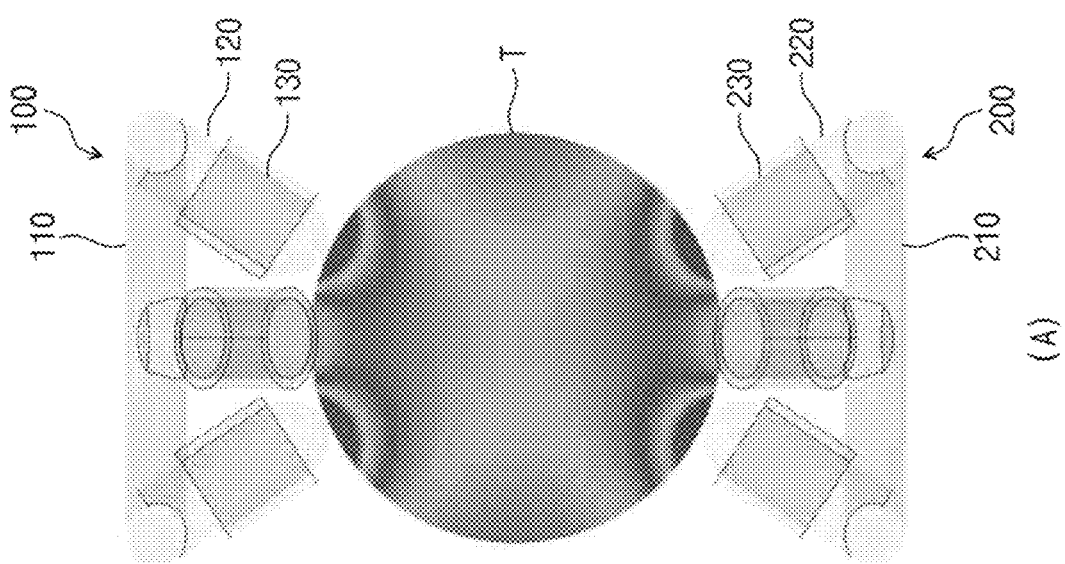
FIG. 3 is a view showing a size of an operation area and an intensity distribution of a magnetic field generated according to a distance between a first magnetic field generation unit and a second magnetic field generation unit.
Figure 3:
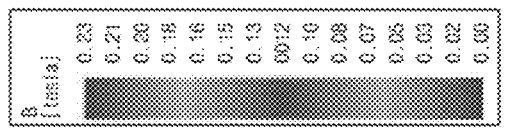

FIG. 3 is a view showing a size of an operation area and an intensity distribution of a magnetic field generated according to a distance between a first magnetic field generation unit and a second magnetic field generation unit.

Referring to FIG. 3(A), it can be seen that when the distance between the first magnetic field generation unit 100 and the second magnetic field generation unit 200 is increased, the operation area T becomes greater and a magnetic field of low intensity is generated. On the other hand, referring to (B), it can be seen that when the distance between the first magnetic field generation unit 100 and the second magnetic field generation unit 200 is decreased, the operation area T becomes smaller and a magnetic field of high intensity is generated.

The pair of connecting arms 330 and 340, the first support arm 350, and the second support arm 360 of the moving module 300 may be formed of a magnetic material. The magnetic field generated in the first coil 130 flows along the first back yoke 110, the first support aim 350, the connecting arms 330 and 340, and the second support arm 360. Accordingly, the magnetic field generated in the operation area T and the magnetic field generated in the first core 120, the first back yoke 110, the first support arm 350, the connecting arms 330 and 340, the second support arm 360, the second the back yoke 210, and the second core 220 form a closed magnetic circuit. The closed magnetic circuit may increase the strength of the magnetic field generated in the operation area T.

The control unit may control the moving module 300 so that the magnetic field is generated in the minimum operation area T required for controlling the target. In addition, the control unit may control the moving module 300 so that the first magnetic field generation unit 100 and the second magnetic field generation unit 200 track the target according to movements of the target in the operation area T. The target may be a microrobot positioned within the body. The microrobot may be positioned in the body's tubular tissue such as blood vessel, bile duct, trachea, esophagus, and urethra, and moved in the tubular tissue by the magnetic field generated by the magnetic field generation units 100 and 200. The microrobot may include at least one permanent magnet controllable by the magnetic field generated by the first and second magnetic field generation units 100 and 200.

Figure 4:
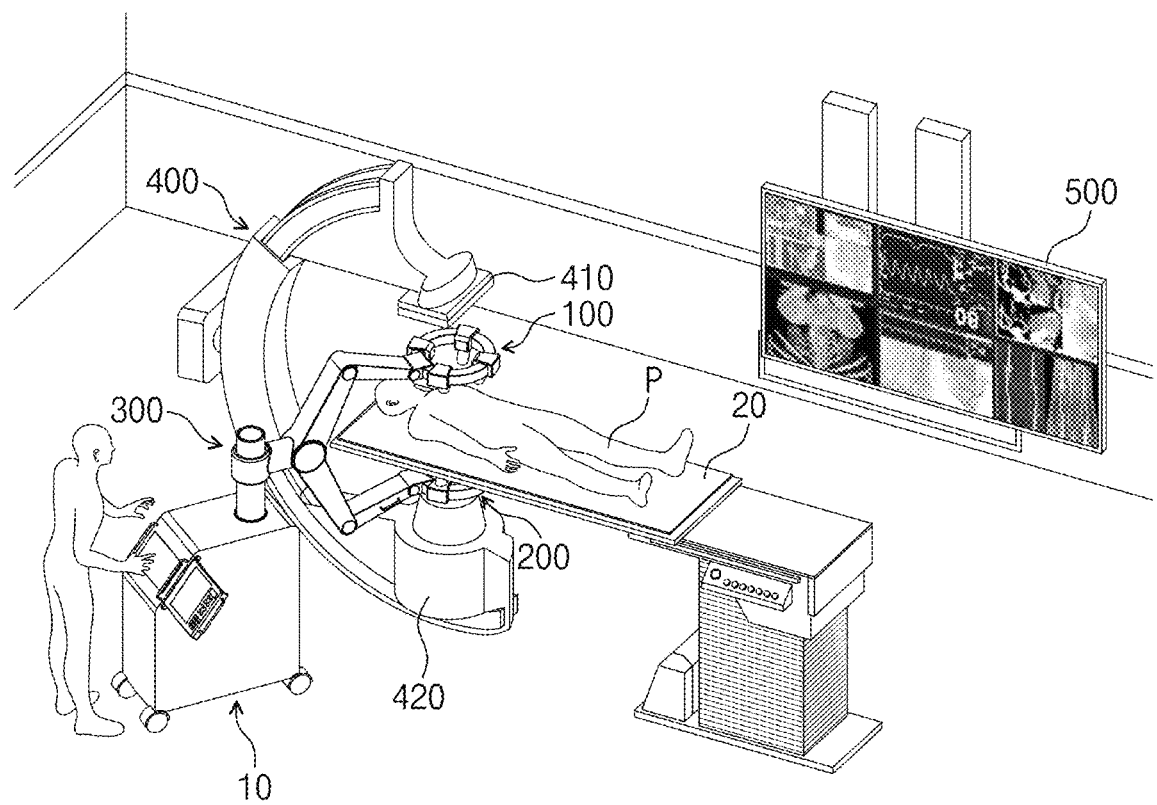
FIGS. 4 and 5 are views showing a process of controlling a microrobot by the first magnetic field generation unit and the second magnetic field generation unit.
Figure 5:
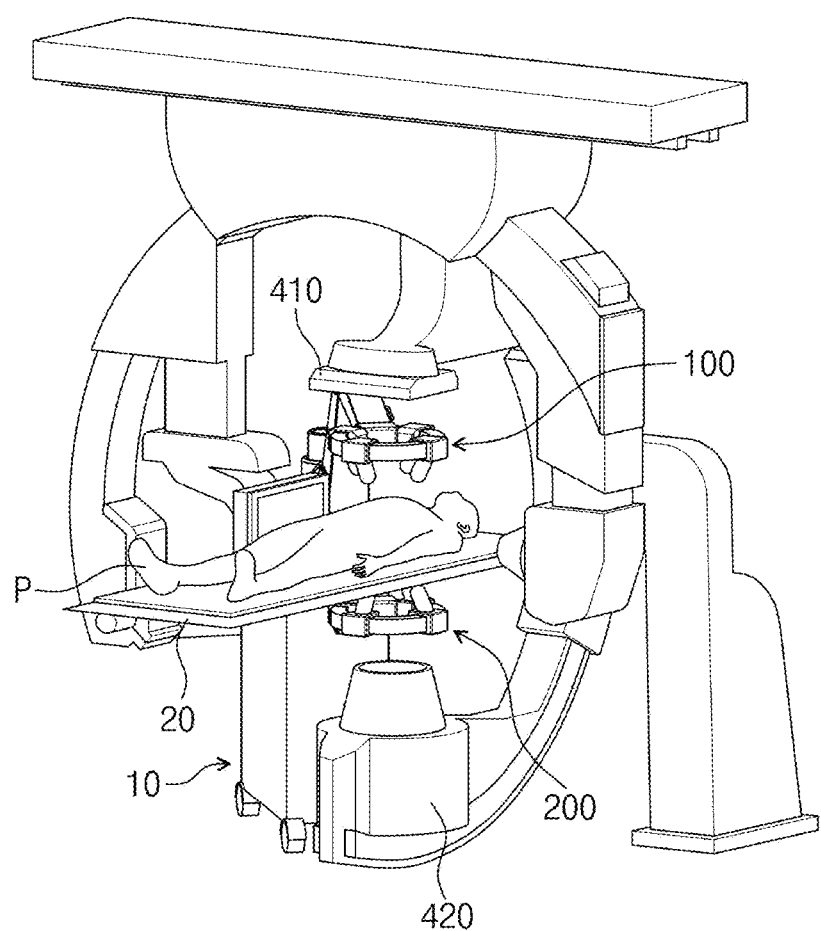
Figure 6:
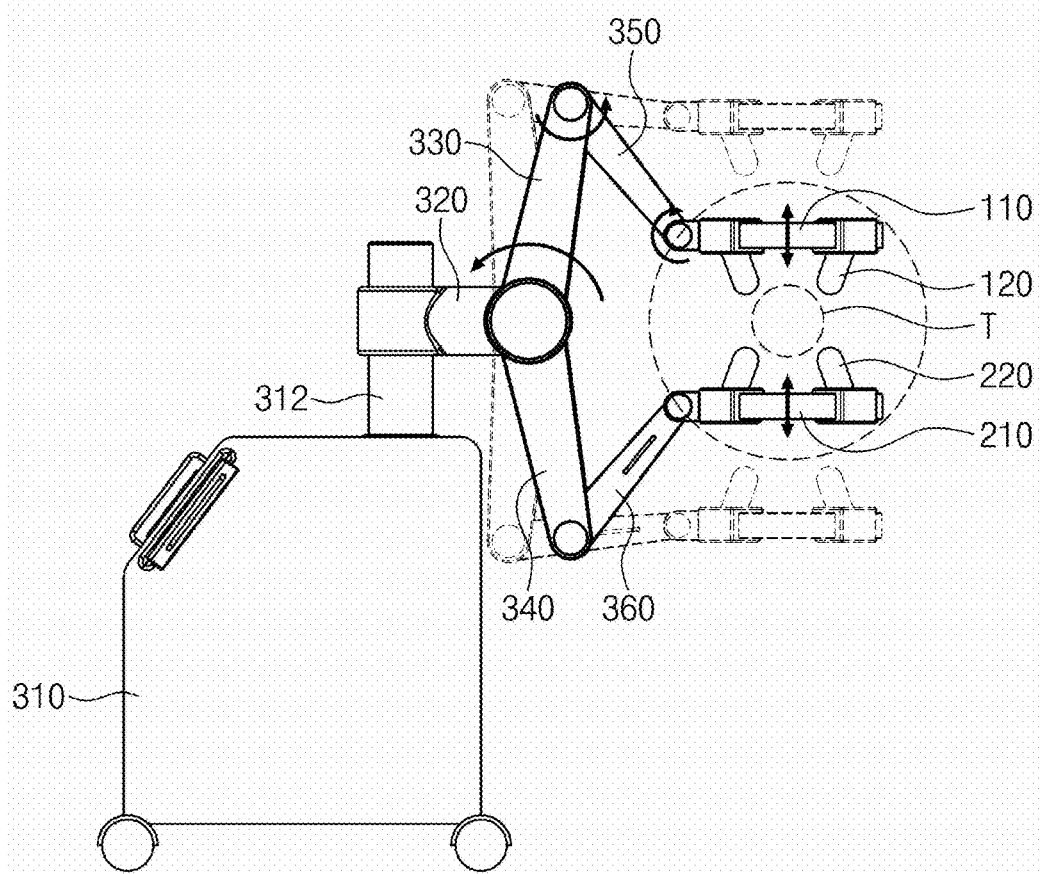
FIGS. 6 to 8 are views showing movements of the first magnetic field generation unit and the second magnetic field generation unit.
Figure 7:
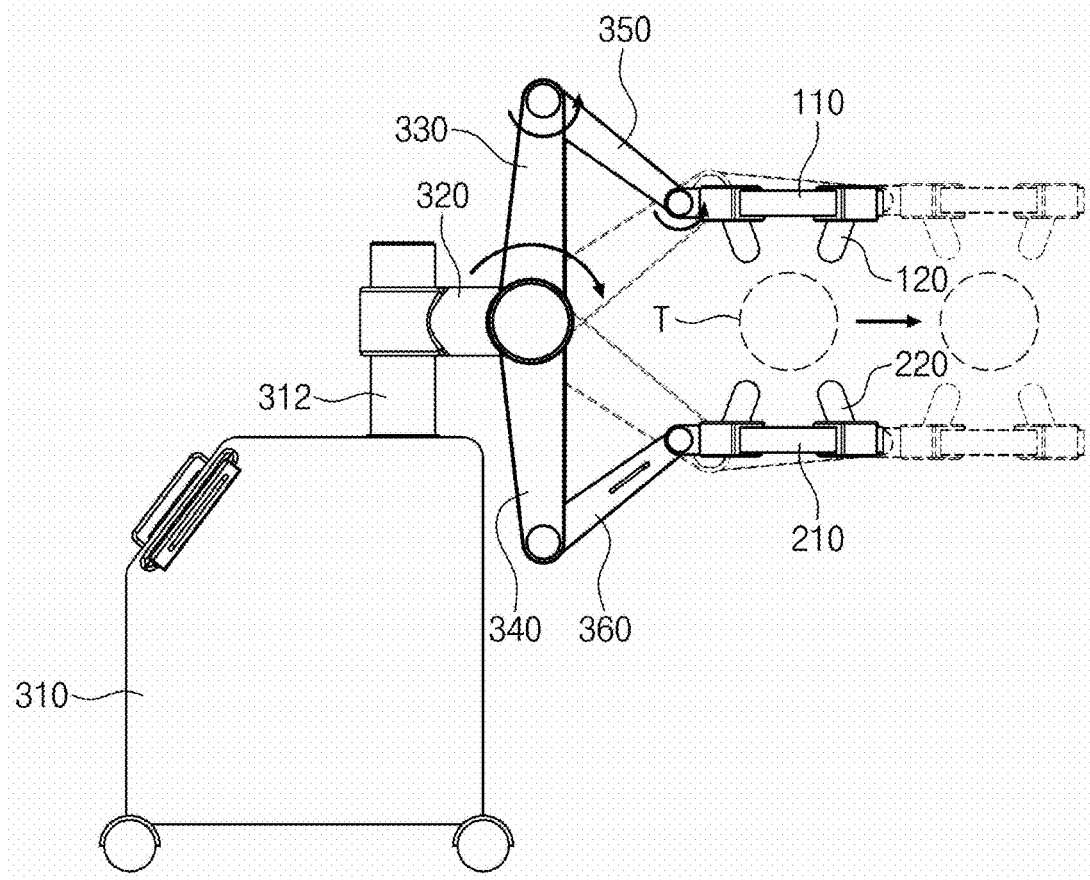
Figure 8:
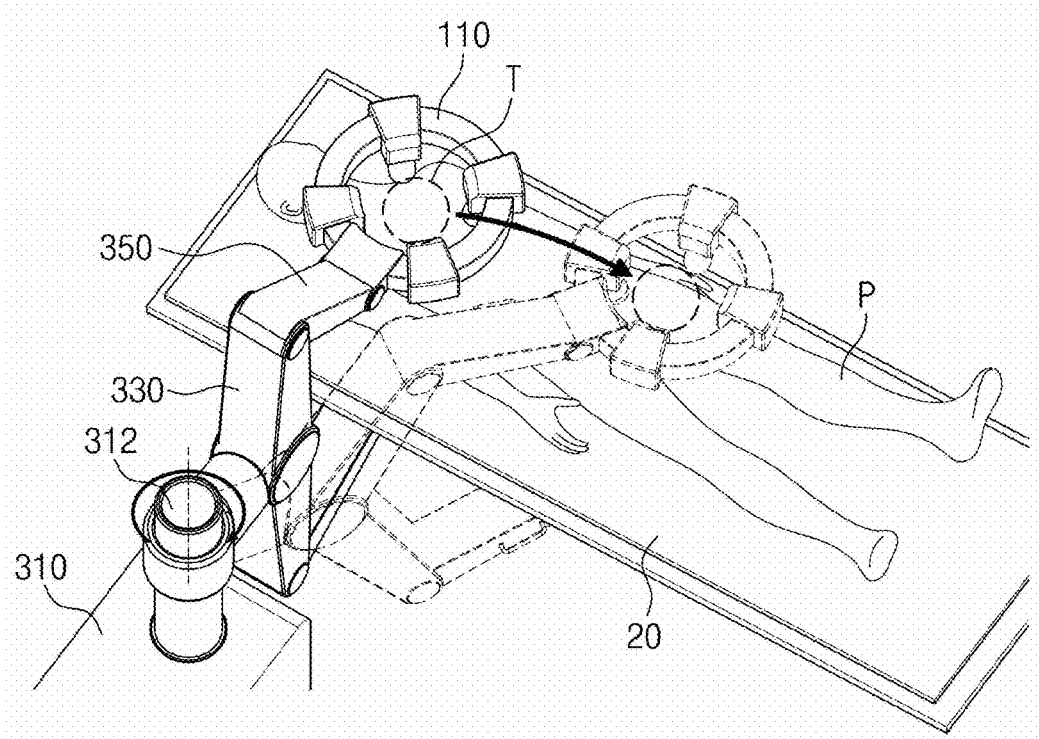

FIGS. 4 and 5 are views showing a process of controlling the microrobot by the first magnetic field generation unit and the second magnetic field generation unit. FIGS. 6 to 8 are views showing movements of the first magnetic field generation unit and the second magnetic field generation unit.

First, referring to FIGS. 4 and 5, the magnetic drive system 10 and a C-arm image capturing unit 400 are positioned while the patient P is lying on a bed 20. The first magnetic field generation unit 100 and the second magnetic field generation unit 200 are positioned between an X-ray irradiator 410 and an X-ray receiver 420 of the C-arm image capturing unit 400. The first magnetic field generation unit 100 is positioned above the bed 20, and the second magnetic field generation unit 200 is positioned below the bed 20. The X-ray irradiator 410, the central axis C1 of the first back yorker 110, the central axis C2 of the second back yorker 210, and the X-ray receiver 420 are aligned in a line.

The X-rays irradiated from the X-ray irradiator 410 are transmitted through the inner space of the first back yoke 110 and the inner space of the second back yoke 210 and transferred to the X-ray receiver 420. The C-arm image capturing unit 400 transmits an X-ray image to a display unit 500. The X-ray image shows the microrobot. In addition, the back yokes 110 and 210 and the cores 120 and 220 may be displayed together in the X-ray image.

Referring to FIG. 6, the control unit brings the first magnetic field generation unit 100 and the second magnetic field generation unit 200 into close contact with the patient's body P, by rotating the connecting arms 330 and 340 and the supporting arms 350 and 360. Accordingly, the operation area T may be minimized to the area where the microrobot is positioned in the patient's body P, and the movement of the microrobot may be controlled by using the high-density magnetic field.

Referring to FIG. 7, the control unit may linearly move the first magnetic field generation unit 100 and the second magnetic field generation unit 200 on the XY plane, by rotating the connecting arms 330 and 340 and supporting arms 350 and 360 according to the movement of the microrobot.

Referring to FIG. 8, the control unit rotates the rotating arm 320 according to the movement of the microrobot, and drives the connecting arms 330 and 340 and the supporting arms 350 and 360, so that the first magnetic field generation unit 100 and the second magnetic field generation unit 200 may track the movement of the microrobot.

The first magnetic field generation unit 100 and the second magnetic field generation unit 200 according to the present invention, are positioned in the space between the X-ray irradiator 410 and the X-ray receiver 420, and X-rays pass through the inner space of the first back yoke 110 and the inner space of the second back yoke 210, so that the interference with the C-arm image capturing unit 400 may be minimized. Accordingly, the first magnetic field generation unit 100 and the second magnetic field generation unit 200 may track the movement of the microrobot in real time and continuously.

Figure 9:
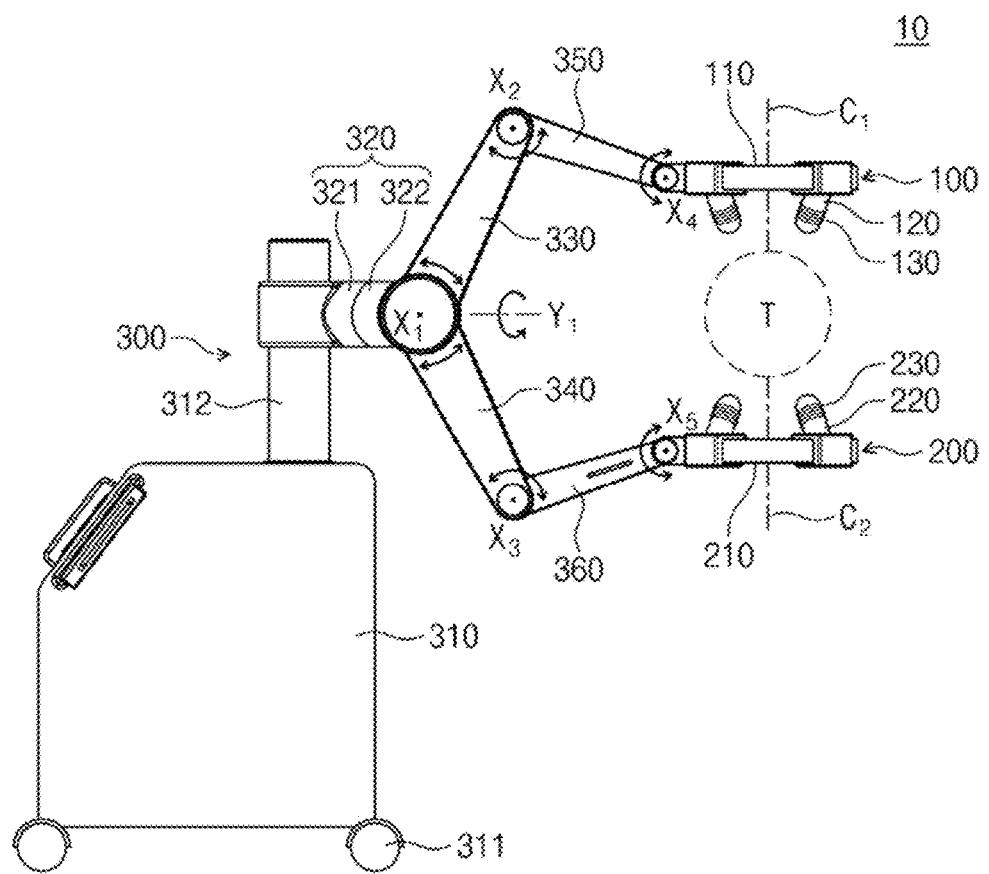
FIG. 9 is a front view showing a magnetic drive system according to another embodiment of the present invention.

FIG. 9 is a front view showing a magnetic drive system according to another embodiment of the present invention.

Referring to FIG. 9, the magnetic drive system 10 is provided such that the rotating arm 320 is rotatable about an axis Y1 in a longitudinal direction thereof. Specifically, the rotating arm 320 includes a first area 321 and a second area 322. The first area 321 is coupled to the support shaft 312 so as to be rotatable about the support shaft 312. The second area 322 connects the first area 321 to the connecting arms 330 and 340. The second area 322 is coupled to the first area 321 so that the longitudinal direction of the rotating arm 320 is rotatable with respect to the first area 321 about the axis Y1. Inclinations of the first back yoke 110 and the second back yoke 210 vary according to the rotation angle of the second area 322. When assumed that the angle at which the central axes C1 and C2 of the first back yoke 110 and the second back yoke 210 are perpendicular to the ground is 0°, the central axes C1 and C2 of the first back yoke 110 and the second back yoke 210 are arranged parallel to the ground when the second area 322 is rotated by 90°, and the positions of the first back yoke 110 and the second back yoke 210 are reversed when the second area 321 is rotated by 180°.

The magnetic drive system 10 may variously change the arranged angles of the first back yoke 110 and the second back yoke 210, according to arrangements of the body part in which the microrobot is positioned and the C-arm image capturing unit 400.

Figure 10:
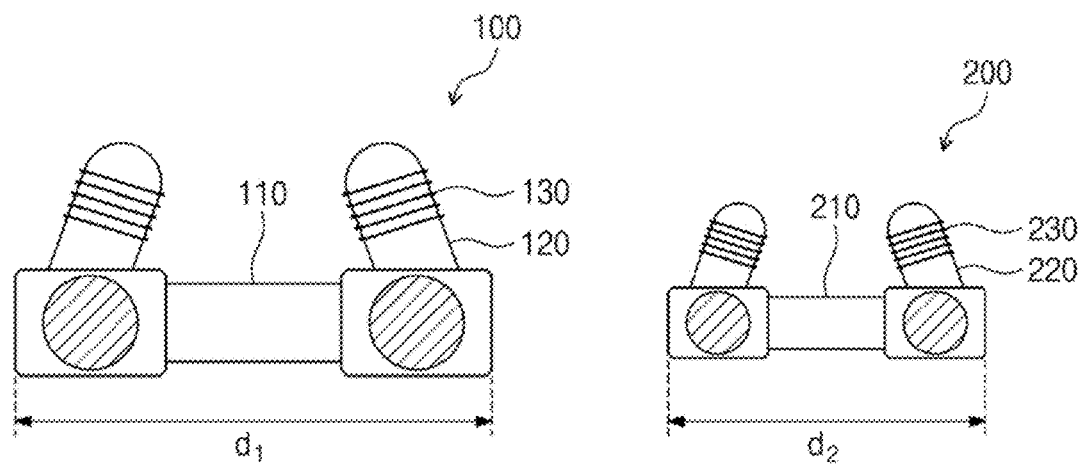
FIG. 10 shows sectional views of a first magnetic field generation unit and a second magnetic field generation unit according to another embodiment of the present invention.

FIG. 10 shows sectional views of a first magnetic field generation unit and a second magnetic field generation unit according to another embodiment of the present invention.

Referring to FIG. 10, the first back yoke 110 has an outer diameter d1 larger than an outer diameter of the second back yoke 210, and has a sectional area larger than a sectional area of the second back yoke 210. In addition, the first core 120 has a sectional area larger than a sectional area of the second core 220. Accordingly, the first magnetic field generation unit 100 may generate a magnetic field with a strength higher than that of the second magnetic field generation unit 200. A magnetic field having a sufficient strength may be generated in the operation area T even when the first magnetic field generation unit 100 is moved away from the patient's body P.

In addition, when the strength of the magnetic field generated in the operation area T is reduced by the bed 20, the first magnetic field generation unit 100 may be positioned under the bed 20, and the second magnetic field generation unit 200 may be positioned above the bed 20. The high-strength magnetic field generated by the first magnetic image generation unit 100 may be effectively transferred to the operation area T.

Figure 11:
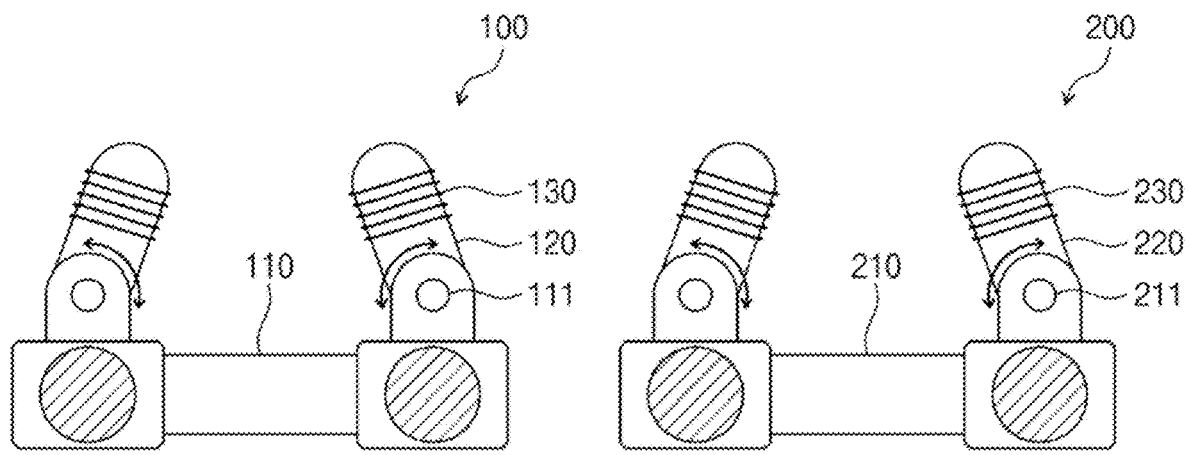
FIG. 11 is a perspective view showing a first magnetic field generation unit and a second magnetic field generation unit according to still another embodiment of the present invention.

FIG. 11 is a perspective view showing a first magnetic field generation unit and a second magnetic field generation unit according to still another embodiment of the present invention.

Referring to FIG. 11, the first core 120 is coupled to the first back yoke 110 through a pin 111, and the second core 220 is coupled to the second back yoke 210 through a pin 211. The first cores 120 and the second cores 220 are rotatable about the pins 111 and 211, respectively. The size of the operation area T and the strength of the magnetic field may be adjusted according to the rotation angles of the first cores 120 and the second cores 220.

Figure 12:
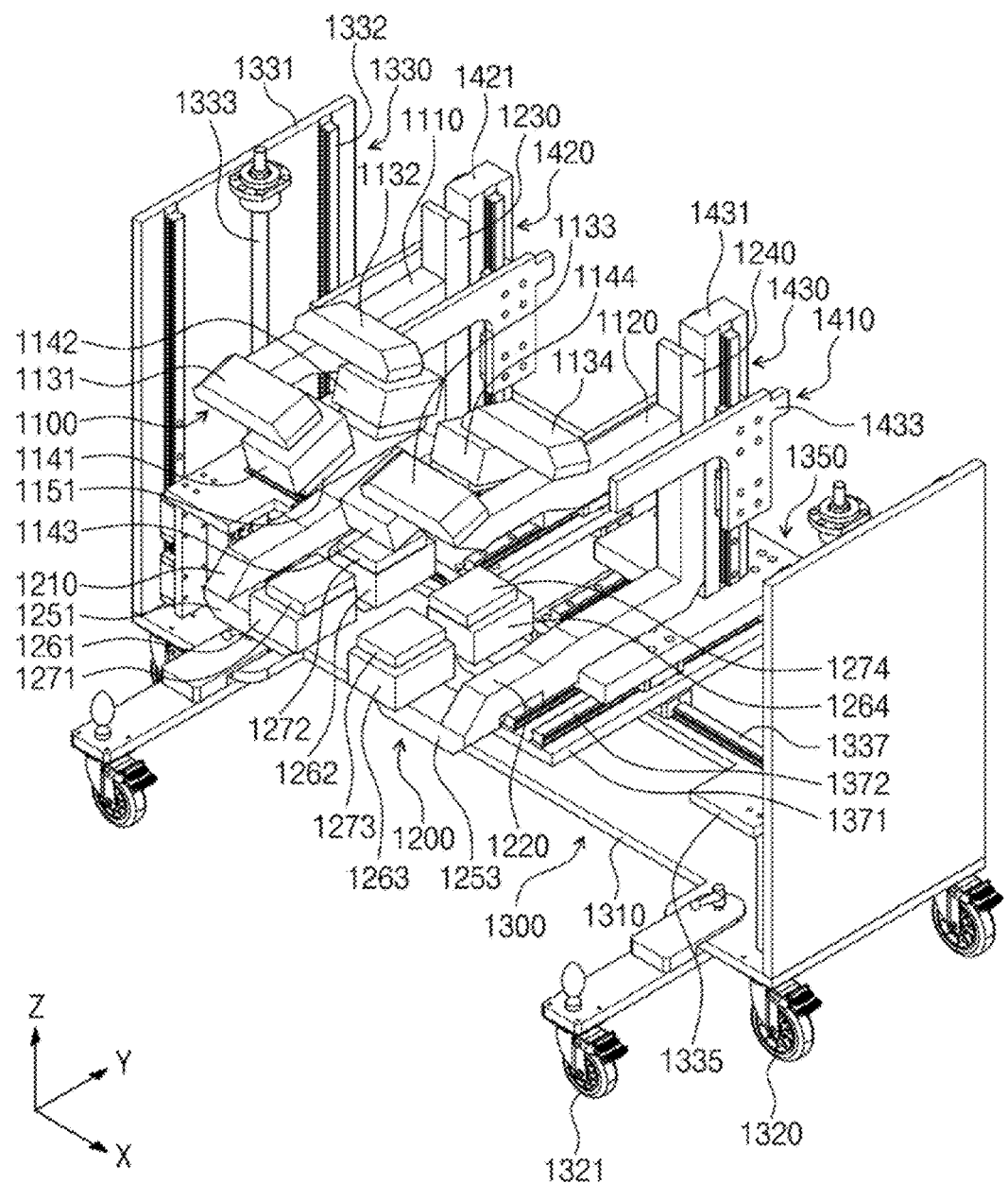
FIG. 12 is a perspective view showing a magnetic drive system according to still another embodiment of the present invention.
Figure 13:
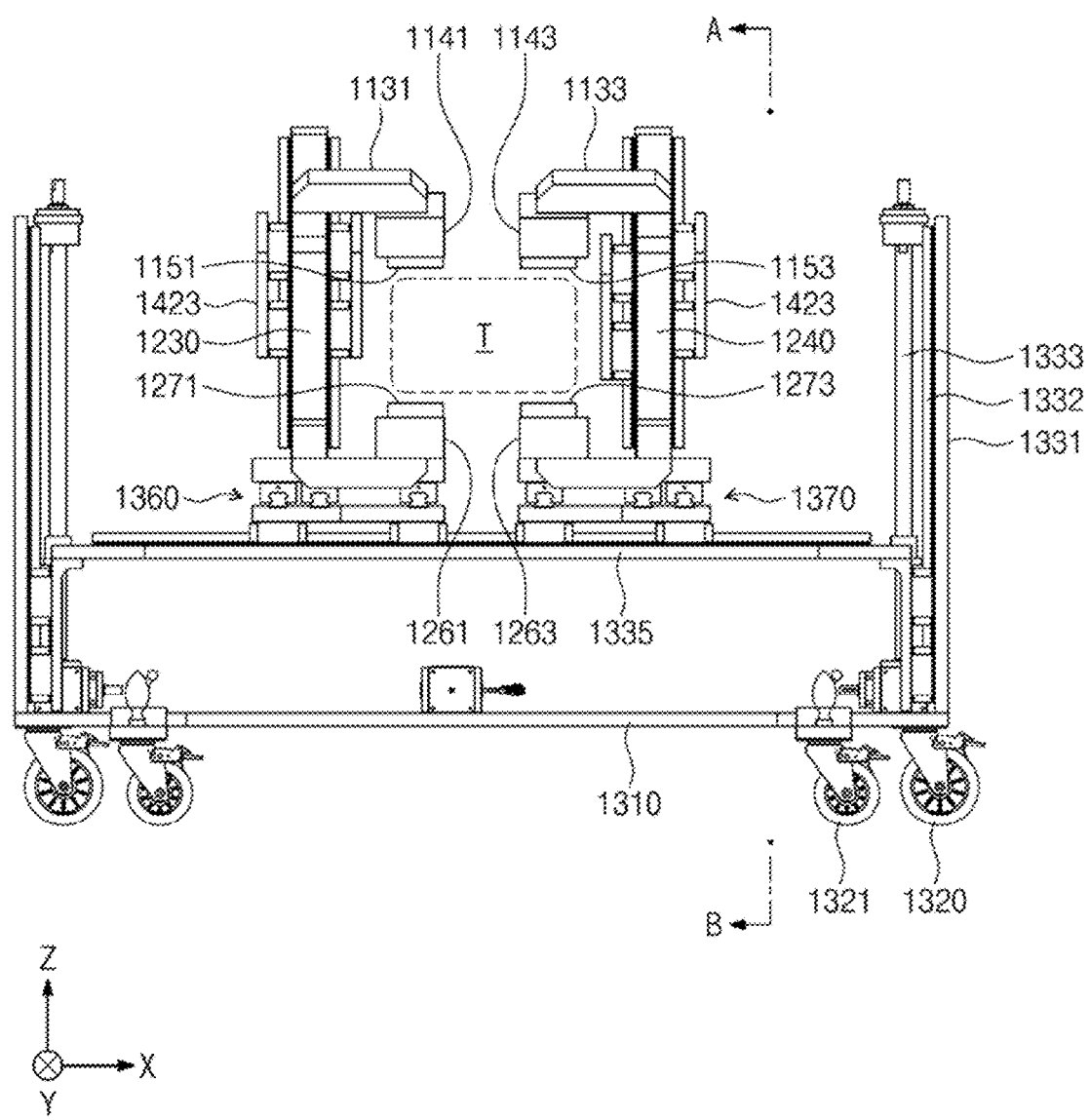
FIG. 13 is a front view showing the magnetic drive system of FIG. 12.
Figure 14:
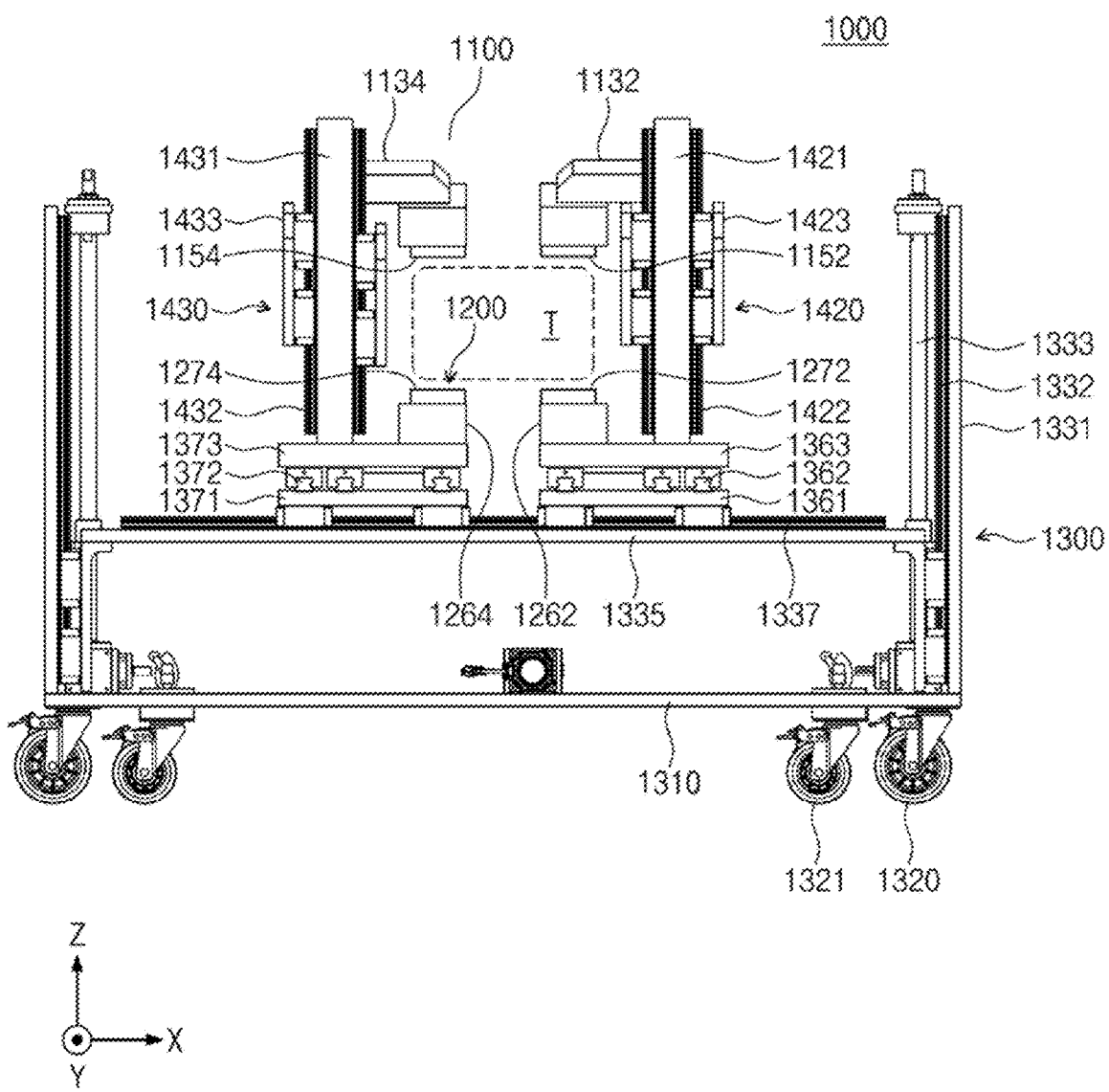
FIG. 14 is a rear view showing the magnetic drive system of FIG. 12.
Figure 15:
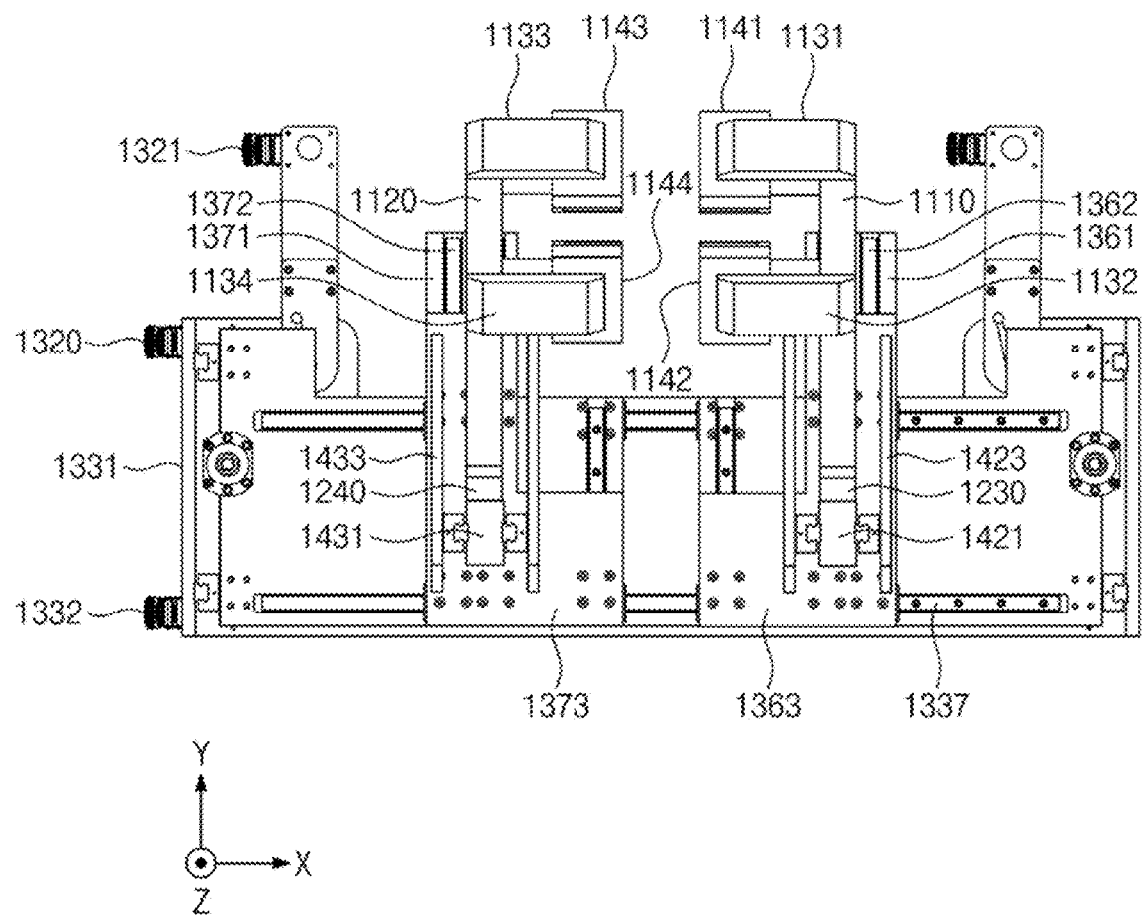
FIG. 15 is a plan view showing the magnetic drive system of FIG. 12.
Figure 16:
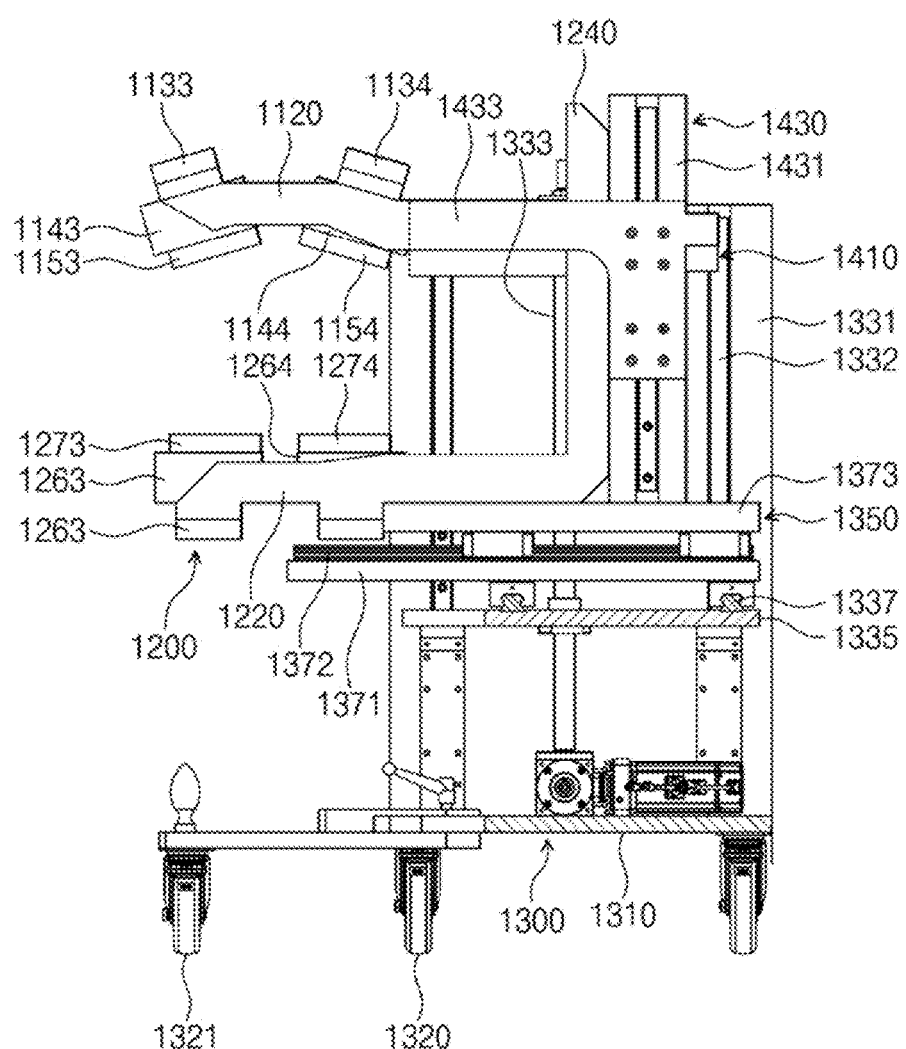
FIG. 16 is a side view taken along line A-B of FIG. 13.

FIG. 12 is a perspective view showing a magnetic drive system according to still another embodiment of the present invention. FIG. 13 is a front view showing the magnetic drive system of FIG. 12. FIG. 14 is a rear view showing the magnetic drive system of FIG. 12. FIG. 15 is a front view showing the magnetic drive system of FIG. 12. FIG. 16 is a side view taken along line A-B of FIG. 13.

Referring to FIGS. 12 to 16, a magnetic drive system 1000 includes: a first magnetic field generation unit 1100, a second magnetic field generation unit 1200, a moving module 1300, and a control unit (not shown).

The first magnetic field generation unit 1100 and the second magnetic field generation unit 1200 are disposed to face each other with the operation area T interposed therebetween, and generate a magnetic field in the operation area T. The first magnetic field generation unit 1100 is positioned above the second magnetic field generation unit 1200.

The moving module 1300 supports and moves the first magnetic field generation unit 1100 and the second magnetic field generation unit 1200. The moving module 1300 may move the first magnetic field generation unit 1100 and the second magnetic field generation unit 1200 along a target positioned in the operation area T.

The first magnetic field generation unit 1100 includes a first upper yoke 1110, a second upper yoke 1120, first to fourth upper cores 1131 to 1134, upper coils 1141 to 1144, and upper core tips 1151 to 1154.

The first upper yoke 1110 is formed of a magnetic material having a predetermined length, and has a longitudinal direction provided in the Y-axis direction.

The second upper yoke 1120 is spaced apart from the first upper yoke 1110 by a predetermined distance in the X-axis direction, and arranged in parallel with the first upper yoke 1110. The second upper yoke 1120 is formed of a magnetic material.

The first upper core 1131 is formed of a magnetic material having a predetermined length, and has a longitudinal direction provided in the X-axis direction. The first upper core 1131 has one end coupled to the first upper yoke 1110 and the other end positioned between the first upper yoke 1110 and the second upper yoke 1120. One area of the first upper core 1131 extends toward the operation area T by a predetermined length.

The second upper core 1132 is provided to have the same shape and material as the first upper core 1131, and spaced apart by a predetermined distance in the Y-axis direction so as to be arranged in parallel with the first upper core 1131. The second upper core 1132 has one end coupled to the first upper yoke 1110 and the other end positioned between the first upper yoke 1110 and the second upper yoke 1120. One area of the second upper core 1120 extends toward the operation area T by a predetermined length.

The third upper core 1133 is provided to have the same shape and material as the first upper core 1131, and has a longitudinal direction provided in the X-axis direction. The third upper core 1133 has one end coupled to the second upper yoke 1120 and the other end positioned between the first upper core 1131 and the second upper yoke 1120. One area of the third upper core 1133 extends toward the operation area T by a predetermined length.

The fourth upper core 1134 is provided to have the same shape and material as the third upper core 1133, and spaced apart by a predetermined distance in the Y-axis direction so as to be arranged in parallel with the third upper core 1133. The fourth upper core 1134 has one end coupled to the second upper yoke 1120 and the other end positioned between the second upper core 1132 and the second upper yoke 1120. One area of the fourth upper core 1134 extends toward the operation area T by a predetermined length.

The upper coils 1141 to 1144 are wound in areas extending toward the operation area T from the first to fourth upper cores 1131 to 1134, respectively. The upper coils 1141 to 1144 generate magnetic fields upon application of an electric current.

According to the embodiment, the upper coils 1141 to 1144 are provided as first to fourth upper coils 1141 to 1144, and wound on the first to fourth upper cores 1131 to 1134, respectively.

The upper core tips 1151 to 1154 are provided at ends of the first to fourth upper cores 1131 to 1134, respectively. The upper core tips 1151 to 1154 are provided as plates formed of a magnetic material having a predetermined thickness. The upper core tips 1151 to 1154 have areas larger than sections of the first to fourth upper cores 1131 to 1134, respectively. According to the embodiment, when viewed from above, edge areas of the upper core tips 1151 to 1154 may be positioned on the same line as edge areas of the upper coils 1141 to 1144 in the Z-axis direction. The upper core tips 1151 to 1154 are provided as first to fourth upper core tips 1151 to 1154, and provided at ends of the first to fourth upper cores 1131 to 1134, respectively.

The second magnetic field generation unit 1200 includes a first lower yoke 1210, a second lower yoke 1220, a first vertical yoke 1230, a second vertical yoke 1240, first to fourth lower cores 1251 to 1154, lower coils 1261 to 1264, and lower core tips 1271 to 1274.

The first lower yoke 1210 is provided to have the same length and material as the first upper yoke 1110. The first lower yoke 1210 is positioned below the first upper yoke 1110 in the Z-axis direction, and arranged in parallel with the first upper yoke 1110.

The second lower yoke 1220 is provided to have the same length and material as the first lower yoke 1210, and spaced apart from the first lower yoke 1210 by a predetermined distance in the X-axis direction. The second lower yoke 1220 is arranged in parallel with the second upper yoke 1120.

The first vertical yoke 1230 is formed of a magnetic material having a predetermined length, and has a longitudinal direction arranged in the Z-axis direction. The first vertical yoke 1230 has a lower end connected to a rear end of the first lower yoke 1210 and an upper end positioned at a rear of the first upper yoke 1110.

The second vertical yoke 1240 is provided to have the same shape and material as the first vertical yoke 1230, and spaced apart by a predetermined distance in the X-axis direction so as to be arranged in parallel with the first vertical yoke 1230. The second vertical yoke 1240 has a lower end connected to a rear end of the second lower yoke 1220 and an upper end positioned at a rear of the second upper yoke 1220.

The first lower core 1251 is formed of a magnetic material having a predetermined length, and has a longitudinal direction provided in the X-axis direction. The first lower core 1251 has one end coupled to the first lower yoke 1210 and the other end positioned between the first lower yoke 1210 and the second lower yoke 1220. One area of the first lower core 1251 has a longitudinal direction extending in the Z-axis direction.

The second lower core 1252 is provided to have the same shape and material as the first lower core 1251, and spaced apart by a predetermined distance in the Y-axis direction so as to be arranged in parallel with the first lower core 1251. The second lower core 1252 has one end coupled to the first lower yoke 1210 and the other end positioned between the first lower yoke 1210 and the second lower yoke 1220. One area of the second lower core 1252 has a longitudinal direction extending in the Z-axis direction.

The third lower core 1253 is provided to have the same shape and material as the first lower core 1251, and has a longitudinal direction provided in the X-axis direction. The third lower core 1253 has one end coupled to the second lower yoke 1220 and the other end positioned between the first lower core 1251 and the second lower yoke 1220. One area of the third lower core 1253 has a longitudinal direction extending in the Z-axis direction.

The fourth lower core 1254 is provided to have the same shape and material as the third lower core 1253, and spaced apart by a predetermined distance in the Y-axis direction so as to be arranged in parallel with the third lower core 1253. The fourth lower core 1254 has one end coupled to the second lower yoke 1220 and the other end positioned between the second lower core 1252 and the second lower yoke 1220. One area of the fourth lower core 1253 has a longitudinal direction extending in the Z-axis direction.

The lower coils 1261 to 1264 are wound in areas of the first to fourth lower cores 1251 to 1254 extending in the Z-axis direction, respectively. The lower coils 1261 to 1264 generate magnetic fields upon application of an electric current. According to the embodiment, the lower coils 1261 to 1264 are provided as first to fourth lower coils 1261 to 1264, and wound on the first to fourth lower cores 1251 to 1254, respectively.

The lower core tips 1271 to 1274 are provided at ends of the first to fourth lower cores 1251 to 1254, respectively. The lower core tips 1271 to 1274 are provided to have the same shape and material as the upper core tips 1151 to 1154. The lower core tips 1271 to 1274 have areas larger than sections of the first to fourth lower cores 1251 to 1254, respectively. According to the embodiment, when viewed from above, edge areas of the lower core tips 1271 to 1274 may be positioned on the same line as edge areas of the lower coils 1261 to 1264 in the Z-axis direction. The lower core tips 1271 to 1274 are provided as first to fourth lower core tips 1271 to 1274, and provided at ends of the first to fourth lower cores 1251 to 1254, respectively.

The moving module 1300 includes a base unit 1310, a moving wheel 1320, a first vertical moving module 1330, a horizontal moving module 1350, a second vertical moving module 1410.

The base unit 1310 is a plate of a predetermined width, and disposed below the first and second magnetic field generation units 1100 and 1200.

A plurality of moving wheels 1320 may be coupled to a bottom surface of the base unit 1310, and roll along the ground. The moving wheels 1320 facilitate the movement of the magnetic drive system 10. According to the embodiment, since the center of gravity of the magnetic drive system 10 is positioned forward, a plurality of auxiliary moving wheels 1321 may be provided to prevent overturning.

The first vertical moving module 1330 moves the first and second magnetic image generation units 1100 and 1200 in the Z-axis direction. The first vertical moving module 1330 includes vertical support plates 1331, a vertical moving rails 1332, vertical moving guide shafts 1333, a vertical moving unit 1335, horizontal moving rails 1337, and a driving unit (not shown).

The vertical support plates 1331 are plates having a predetermined width, and placed at both ends of the base unit 1310, respectively. A pair of vertical support plates 1331 are provided to be vertically erected on the top of the base unit 1310 to face each other.

The vertical moving rails 1332 are provided on one sides of the vertical support plates 1131 facing each other, respectively. The vertical moving rails 1332 are arranged in a longitudinal direction parallel to the Z-axis. At least two vertical moving rails 1332 are provided on each of the vertical support plates 1331, and arranged in parallel with each other.

A pair of vertical moving guide shafts 1333 are provided, and spaced apart from each other in the X-axis direction so as to be disposed perpendicular to the top of the base unit 1310. The vertical moving guide shafts 1333 are adjacent to the vertical support plates 1331, respectively, and provided at a height corresponding to the vertical support plate 1331.

The vertical moving unit 1335 is positioned above the base unit 1310, and provided as a plate of a predetermined width. Both ends of the vertical moving unit 1334 are coupled to the vertical moving rails 1332, and movable along the vertical moving rails 1332. The vertical moving unit 1335 is formed therein with an insertion hole (not shown) into which the vertical moving guide shaft 1333 is inserted, and the vertical moving guide shaft 1333 guides the movement of the vertical moving unit 1335.

The horizontal moving rails 1337 are provided on the top of the vertical moving unit 1335. The horizontal moving rails 1337 are provided with a longitudinal direction extending in the X-axis direction. A pair of horizontal moving rails 1337 are provided, and spaced apart from each other in the Y-axis direction so as to be parallel with each other. The horizontal moving rails 1337 guide the movement of the horizontal moving module 1350.

The driving unit generates a driving force that enables the vertical moving unit 1335 to move in the Z-axis direction.

The horizontal moving module 1350 linearly moves the first upper yoke 1110 and the first lower yoke 1210 integrally, or linearly moves the second upper yoke 1120 and the second lower yoke 1220 integrally, so as to change the distance in the Y-axis direction of the second upper yoke 1120 and the second lower yoke 1220 with respect to the first upper yoke 1110 and the first lower yoke 1210. The horizontal moving module 1350 includes a first horizontal moving module 1360 and a second horizontal moving module 1370. The first horizontal moving module 1360 moves the first upper yoke 1110 and the first lower yoke 1210 in the X-axis direction and the Y-axis direction, and the second horizontal moving module 1370 moves the second upper yoke 1120 and the second lower yoke 1220 in the X-axis direction and the Y-axis direction.

The first horizontal moving module 1360 includes a first X-axis moving plate 1361, a first Y-axis moving rail 1362, a first Y-axis moving plate 1363, and a driving unit (not shown).

The first X-axis moving plate 1361 is placed on the horizontal moving rail 1337, and movable in the X-axis direction along the horizontal moving rail 1337.

The first Y-axis moving rail 1362 is installed on the top of the first X-axis moving plate 1361, and has a longitudinal direction provided in the Y-axis direction. A plurality of first Y-axis moving rails 1362 are provided, and spaced apart from each other in the X-axis direction so as to be parallel with each other. According to the embodiment, three first Y-axis moving rails 1362 are arranged parallel to each other.

The first Y-axis moving plate 1363 is placed on the first Y-axis moving rail 1362, and movable in the Y-axis direction along the first Y-axis moving rail 1362.

The driving unit generates motive power to move the first X-axis moving plate 1361 and the first Y-axis moving plate 1363.

The second horizontal moving module 1370 moves the second upper yoke 1120 and the second lower yoke 1220 in the X-axis direction and the Y-axial direction. The second horizontal moving module 1370 includes a second X-axis moving plate 1371, a second Y-axis moving rail 1372, a second Y-axis moving plate 1373, and a driving unit (not shown).

The second X-axis moving plate 1371 is placed on the horizontal moving rail 1337, and movable in the X-axis direction along the horizontal moving rail 1337.

The second Y-axis moving rail 1372 is installed on the top of the second X-axis moving plate 1371, and has a longitudinal direction provided in the Y-axis direction. A plurality of second Y-axis moving rails 1372 are provided, and spaced apart from each other in the X-axis direction so as to be parallel with each other. According to the embodiment, three second Y-axis moving rails 1372 are arranged parallel to each other.

The second Y-axis moving plate 1373 is placed on the second Y-axis moving rail 1372, and movable in the Y-axis direction along the second Y-axis moving rail 1372.

The driving unit generates motive power to move the second X-axis moving plate 1371 and the second Y-axis moving plate 1373.

The second vertical moving module 1410 relatively and linearly moves the first upper yoke 1110 and the second upper yoke 1120 with respect to the first lower yoke 1210 and the second lower yoke 1220 in the Z-axis direction. The second vertical moving module 1410 includes a first upper yoke vertical moving module 1420 and a second upper yoke vertical moving module 1430.

The first upper yoke vertical moving module 1420 is coupled to the first Y-axis moving plate 1363, and moves the first upper yoke 1110 in the Z-axis direction. The first upper yoke vertical moving module 1420 includes a first vertical support shaft 1421, first guide rails 1422, first yoke support plates 1423, and a driving unit (not shown).

The first vertical support shaft 1421 is fixedly installed on the top of the first Y-axis moving plate 1363, and positioned at a rear of the first vertical yoke 1230. The first vertical support shaft 1421 has a longitudinal direction arranged in the Z-axis direction. The first vertical support shaft 1421 has an upper end positioned at the same height as an upper end of the first vertical yoke 1230.

The first guide rails 1422 are coupled to both sides of the first vertical support shaft 1421, and have a longitudinal direction provided in the longitudinal direction of the first vertical support shaft 1421.

A pair of first yoke support plates 1423 are provided, and disposed at both sides of the first vertical support shaft 1421 to face each other with the first vertical support shaft 1421 interposed therebetween. The first yoke support plate 1423 has a longitudinal direction provided in the Y-axis direction, and has a front end fixedly coupled to both sides of the first upper yoke 1110. The first yoke support plate 1423 supports the first upper yoke 1110. The first yoke support plate 1423 is movable in the Z-axis direction along the first guide rail 1422, and accordingly, the first upper yoke 1110 may be moved in the Z-axis direction to change a relative distance to the first lower yoke 1210. According to the embodiment, the first yoke support plate 1423 may be formed of a non-magnetic material.

The driving unit generates motive power for moving the first yoke support plate 1423.

The second upper yoke vertical moving module 1430 is coupled to the second Y-axis moving plate 1373, and moves the second upper yoke 1120 in the Z-axis direction. The second upper yoke vertical moving module 1430 includes a second vertical support shaft 1431, second guide rails 1432, second yoke support plates 1433, and a driving unit (not shown).

The second vertical support shaft 1431 is fixedly installed on the top of the second Y-axis moving plate 1373, and positioned at a rear of the second vertical yoke 1240. The second vertical support shaft 1431 has a longitudinal direction arranged in the Z-axis direction. The second vertical support shaft 1431 has an upper end positioned at the same height as an upper end of the second vertical yoke 1240.

The second guide rails 1432 are coupled to both sides of the second vertical support shaft 1431, and have a longitudinal direction provided in the longitudinal direction of the second vertical support shaft 1431.

A pair of second yoke support plates 1433 are provided, and disposed at both sides of the second vertical support shaft 1431 to face each other with the second vertical support shaft 1431 interposed therebetween. The second yoke support plate 1433 has a longitudinal direction provided in the Y-axis direction, and has a front end fixedly coupled to both sides of the second upper yoke 1120. The second yoke support plate 1433 supports the second upper yoke 1120. The second yoke support plate 1433 is movable in the Z-axis direction along the second guide rail 1432, and Accordingly, the second upper yoke 1120 may be moved in the Z-axis direction to change a relative distance to the second lower yoke 1220. According to the embodiment, the second yoke support plate 1433 may be formed of a non-magnetic material.

The driving unit generates motive power for moving the second yoke support plate 1433.

Figure 17:
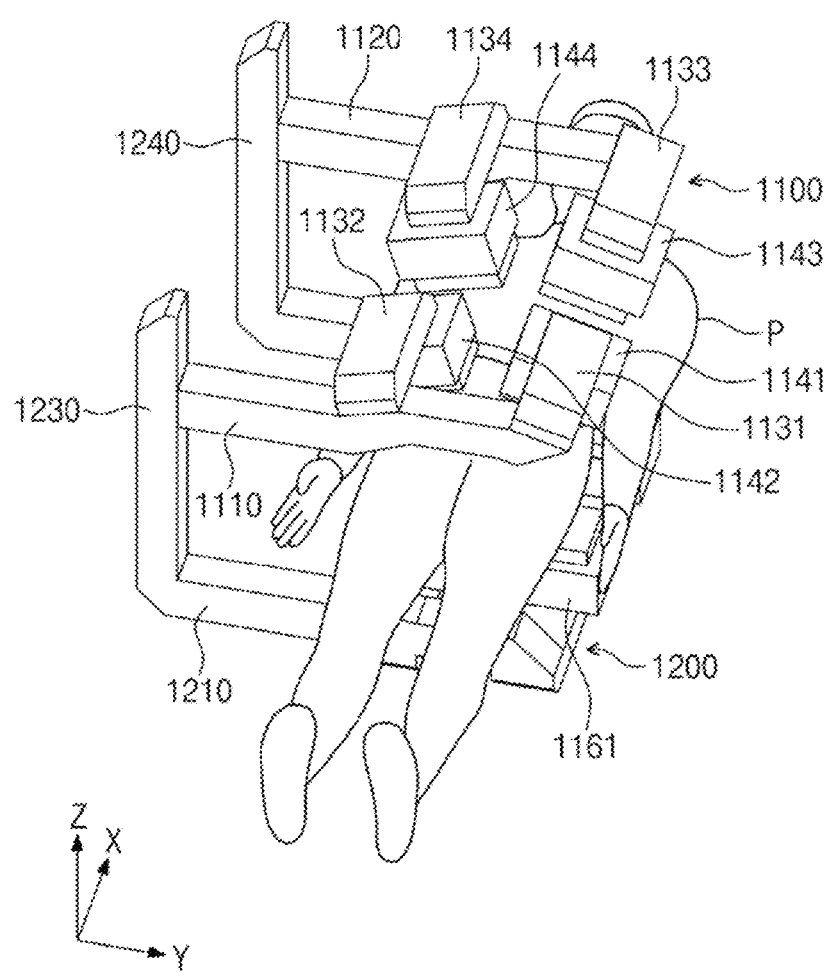
FIG. 17 is a view showing an example of use of the first and second magnetic field generation units.
Figure 18:
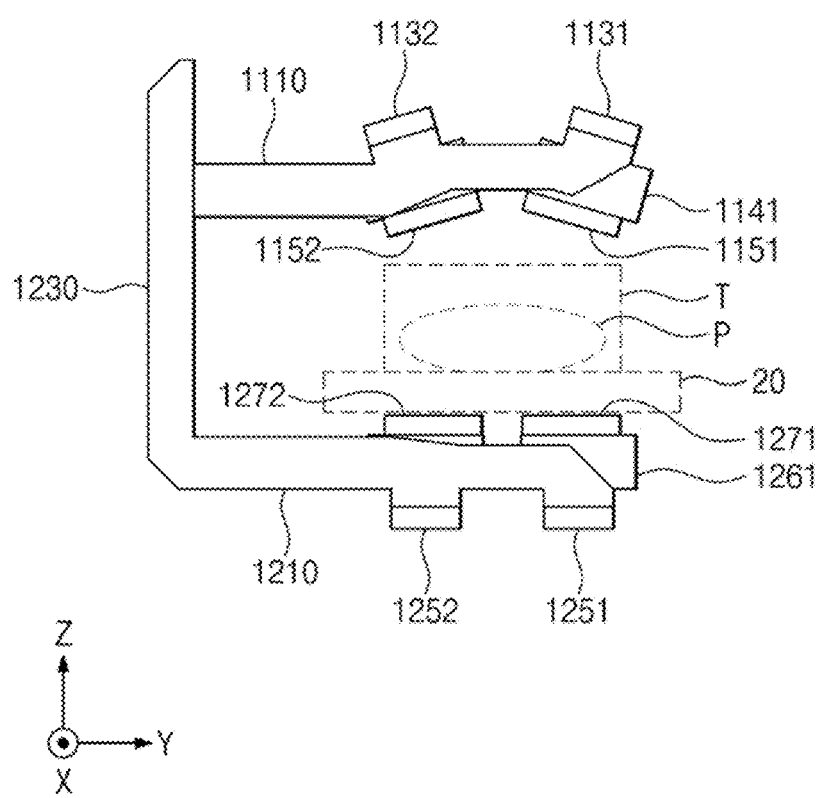
FIG. 18 is a side view showing the first and second magnetic field generation units.

FIG. 17 is a view showing an example of use of the first and second magnetic field generation units. FIG. 18 is a side view showing the first and second magnetic field generation units. FIGS. 19 to 22 are views showing a state in which the first and second magnetic field generation units according to the embodiment of the present invention are moved.

First, referring to FIGS. 17 and 18, the first magnetic field generation unit 1100 is positioned above the patient P, and the second magnetic field generation unit 1200 is positioned below the bed 20. A magnetic field is generated in the operation area T between the first and second magnetic field generation units 1100 and 1200, and the magnetic field controls the movement of the microrobot inserted into the blood vessel of the patient P. According to the embodiment, the upper cores 1131 to 1134 have areas in which the upper coils 1141 to 1144 are wound so as to be inclined toward the center of the operation area T, respectively, and the lower cores 1251 to 1254 have areas in which the lower coils 1261 to 1264 are wound so as to be arranged in the Z-axis direction, respectively. The upper core tips 1151 to 1154 are inclined due to the inclined arrangement structure of the upper cores 1131 to 1134, so as to come into maximally close contact with the body of the patient P, and the arrangement of the lower cores 1251 to 1254 enables the lower core tips 1271 to 1274 to come into maximally close contact with the bed 20. Accordingly, a gap between the patient and the magnetic field generation units 1100 and 1200 may be minimized.

The first and second magnetic field generation units 1100 and 1200 are controlled by the control unit so as to track the movement of the microrobot through the movement described in FIGS. 19 to 22.

Figure 19:
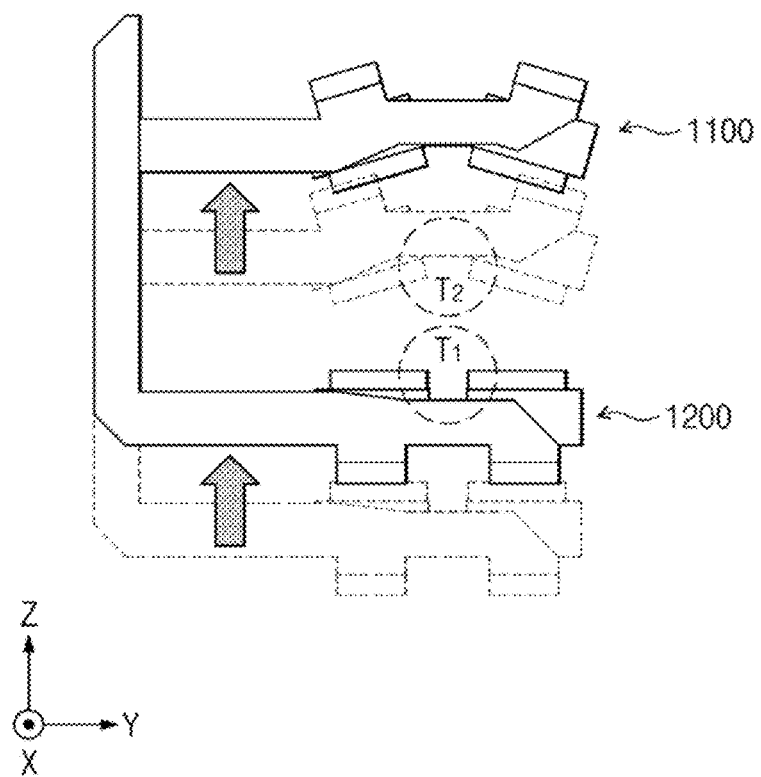
FIGS. 19 to 22 are views showing a state in which the first and second magnetic field generation units according to one embodiment of the present invention are moved.

Referring to FIG. 19, the first and second magnetic image generation units 1100 and 1200 may be moved in the Z-axis direction according to driving the first vertical moving module 1330. Specifically, the vertical moving unit 1335 is moved in the Z-axis direction along the vertical moving rail 1332 by the driving of the driving unit, so that the first and second magnetic field generation units 1100 and 1200 may be moved integrally.

Figure 20:
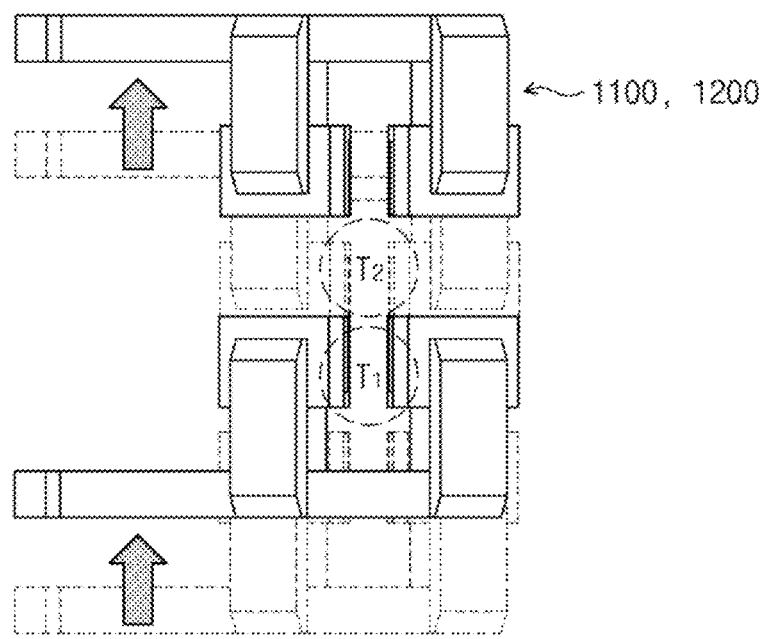

Referring to FIG. 20, the first upper yoke 1110 and the first lower yoke 1210 may be linearly moved in the X-axis direction when the first X-axis moving plate 1361 is moved along the horizontal moving rail 1337, and the second upper yoke 1120 and the second lower yoke 1220 may be linearly moved in the X-axis direction when the second X-axis moving plate 1371 is moved along the horizontal moving rail 1337. According to the embodiment, while one of the first X-axis moving plate 1361 and the second X-axis moving plate 1371 stops, the other may be moved. According to another embodiment, the first X-axis moving plate 1361 and the second X-axis moving plate 1371 may be simultaneously moved in the same direction. According to still another embodiment, the first X-axis moving plate 1361 and the second X-axis moving plate 1371 may be moved in opposite directions. Due to the movement of the first X-axis moving plate 1361 and the second X-axis moving plate 1371, the position of the operation area T may be shifted, and the size of the operation area T may be changed.

Figure 21:
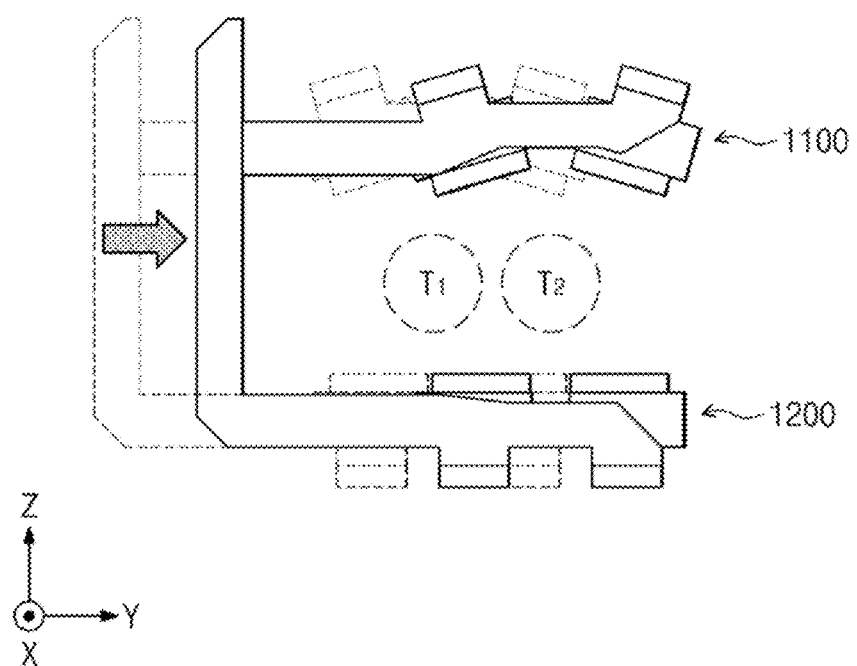

With reference to FIG. 21, the first upper yoke 1110 and the first lower yoke 1210 may be linearly moved in the Y-axis direction when the first Y-axis moving plate 1363 is moved along the first Y-axis moving rail 1362, and the second upper yoke 1120 and the second lower yoke 1220 may be linearly moved in the Y-axis direction when the second Y-axis moving plate 1373 is moved along the second Y-axis moving rail 1372.

Figure 22:
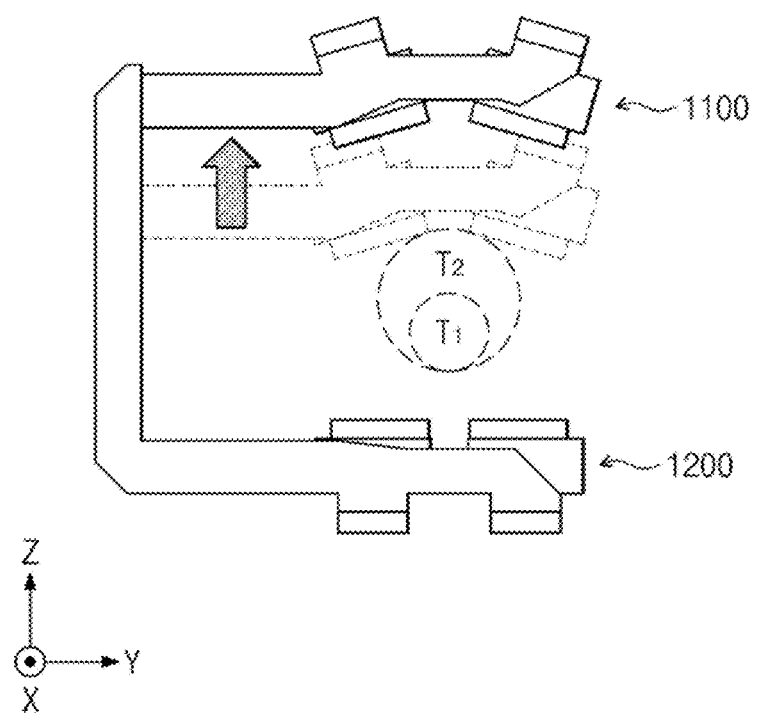

Referring to FIG. 22, the first upper yoke 1110 may be moved together when the first yoke support plate 1423 is moved in the Z-axis direction along the first vertical support shaft 1421, and the second upper yoke 1120 may be moved together when the second yoke support plate 1433 is moved in the Z-axis direction along the second vertical support shaft 1431. When the first and second upper yokes 1110 and 1120 are moved, the distance between the first to fourth upper cores 1131 to 1134 and the first to fourth lower cores 1251 to 1254 may be changed, and the size of the operation area T may be changed.

In the above-described magnetic drive system 10, first and second upper yokes 1110 and 1120, first and second lower yokes 1210 and 1220, first to fourth upper cores 1131 to 1134, first to fourth lower cores 1251 to 1254, and the first and second vertical yokes 1410 and 1420 are formed of a magnetic material. For this reason, when magnetic fields are generated in the upper coils 1141 to 1144 and the lower coils 1261 to 1264, the magnetic field generated in the operation area T and the magnetic field generated in the first and second upper cores 1131 and 1132, the first upper yoke 1110, the first vertical yoke 1410, the first lower yoke 1210, and the first and second lower cores 1151 and 1152 are forms one closed magnetic circuit. In addition, the magnetic field generated in the operation area T and the magnetic field generated in the third and fourth upper cores 1133 and 1134, the second upper yoke 1120, the second vertical yoke 1240, the second lower yoke 1220, and the third and fourth lower cores 1153 and 1154 form another closed magnetic circuit. The formation of the closed magnetic circuit increases the magnetic flux density in the operation area T.

Figure 23:
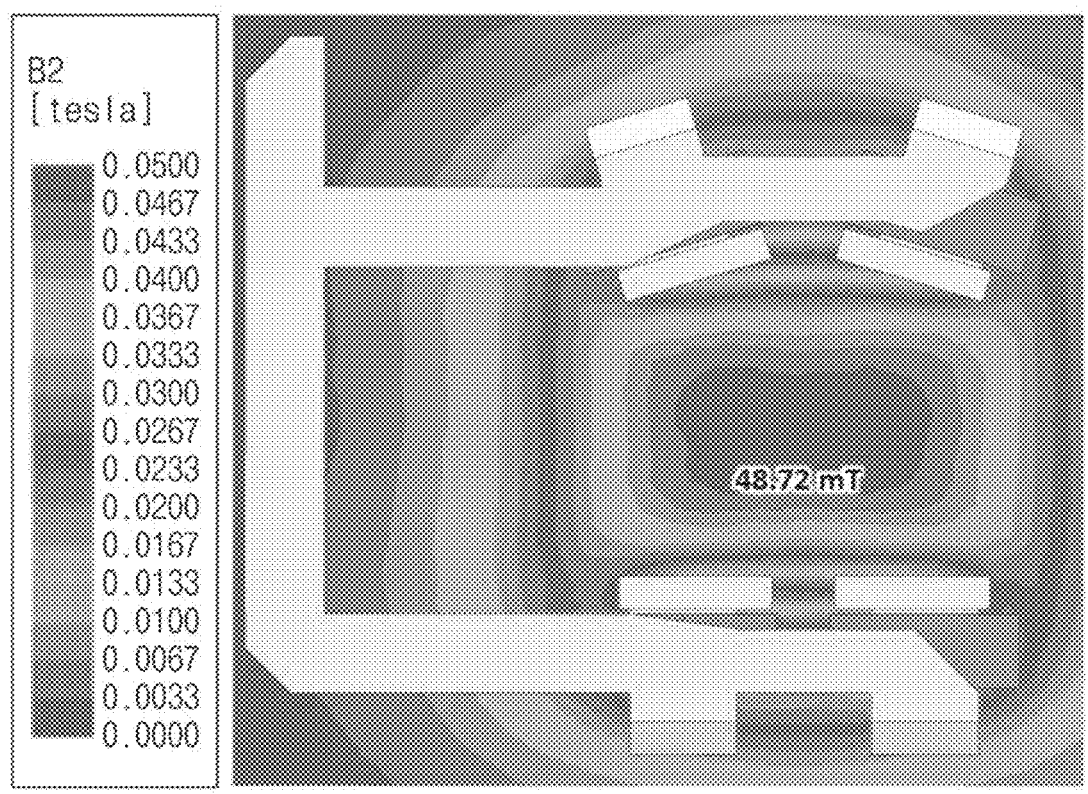
FIG. 23 is a view showing the strength of magnetic fields in the operation area generated by the first and second magnetic field generation units according to the embodiment of the present invention.
Figure 24:
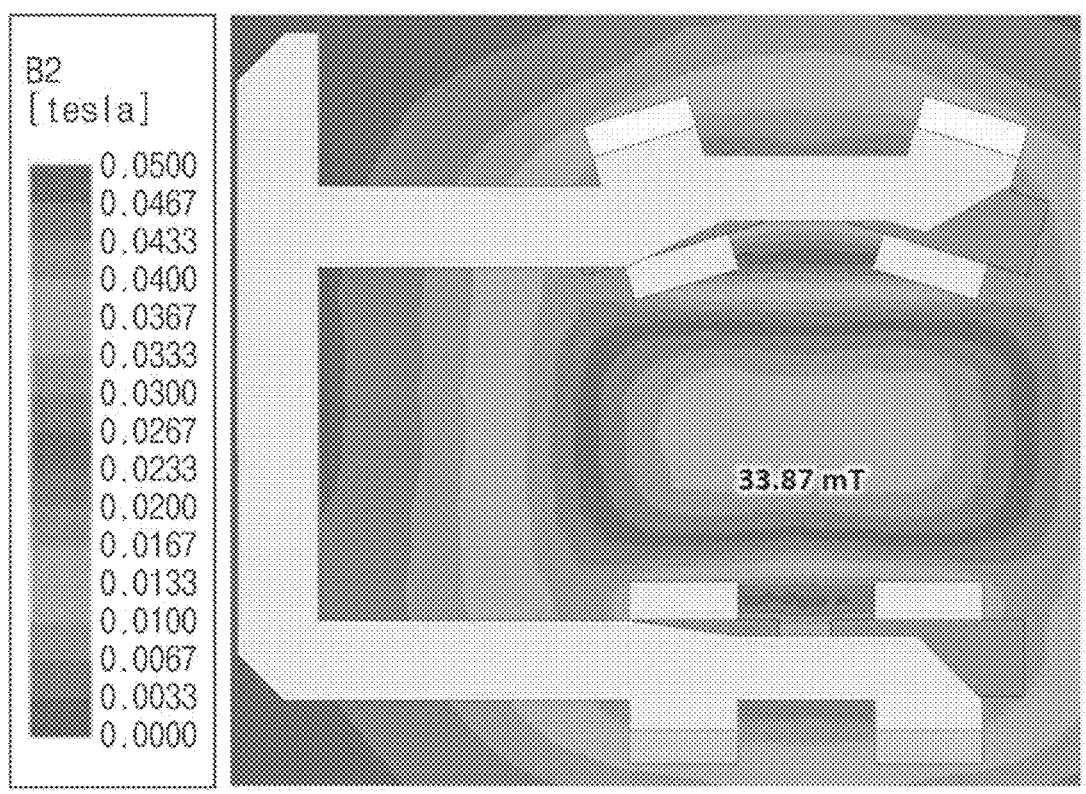
FIG. 24 is a view showing a strength of a magnetic field in an operation area in an embodiment in which an upper core tip and a lower core tip are not provided.

FIG. 23 is a view showing the strength of magnetic fields in the operation area generated by the first and second magnetic field generation units according to the embodiment of the present invention. FIG. 24 is a view showing a strength of a magnetic field in an operation area in an embodiment in which an upper core tip and a lower core tip are not provided.

Referring to FIGS. 23 and 24, it can be seen that when the upper core tips 1151 to 1154 and the lower core tips 1271 to 1274 are provided, the magnetic flux density at the center of the operation area T is increased compared to the case where the core tips are not provided. According to the embodiment, in the case of applying the same magnetomotive force (8,200 A*turns) to the upper coils 1141 to 1144 and the lower coils 1261 to 1264, the magnetic flux density of about 33.87 mT is generated at the center of the operation area T when no core tip is provided, however, it can be seen that when provided with the core tips 1151 to 1154 and 1271 to 1274, the magnetic flux density of about 48.72 mT is generated. This is interpreted as a result of a decrease in magnetic resistance as the air gap between the ends of the cores 1131 to 1134 and 1251 to 1254 is reduced by providing the core tips 1151 to 1154 and 1271 to 1274.

In the vascular intervention procedure using the magnetic drive system 10, the C-arm image capturing unit is disposed together with the magnetic drive system 10, wherein the X-ray irradiator of the C-arm image capturing unit maybe disposed above the first magnetic field generation unit 1100 and the X-ray receiver may be disposed under the second magnetic field generation unit 1200, or may be disposed in reverse. Due to the spatial limitation when the C-arm image capturing unit is provided, the heights in the Z-direction of the upper cores 1131 to 1134 and the lower cores 1251 to 1254 required to be minimized, and this signifies that the height for winding the coils 1141 to 1144 and 1261 to 1264 may be reduced. The number of turns of the coils 1141 to 1144 and 1261 to 1264 in the width direction of the cores 1131 to 1134 and 1251 to 1254 may be increased in order to generate the magnetic flux density of a sufficient magnitude. However, when the coils 1141 to 1144 and 1261 to 1264 are widened in the width direction of the cores 1131 to 1134 and 1251 to 1254, the space through which X-rays penetrate may be reduced, and accordingly the interference between the coils 1141 to 1144 and 1261 to 1264 and the X-rays may occur. In this case, the space through which the X-rays penetrate may be secured by increasing the distance between the cores 1131 to 1134 and 1251 to 1254. However, the magnetic resistance is increased, and accordingly, the magnetic flux density with sufficient strength cannot be generated in the operation area T.

The core tips 1151 to 1154 and 1271 to 1274 reduce the air gap between the ends of cores 1131 to 1134 and 1251 to 1254. Even when the magnetic resistance is reduced by providing the core tips 1151 to 1154 and 1271 to 1274, and the heights in the Z-direction of the cores 1131 to 1134 and 1251 to 1254 are minimized, the magnetic field performance may be maximized.

Figure 25:
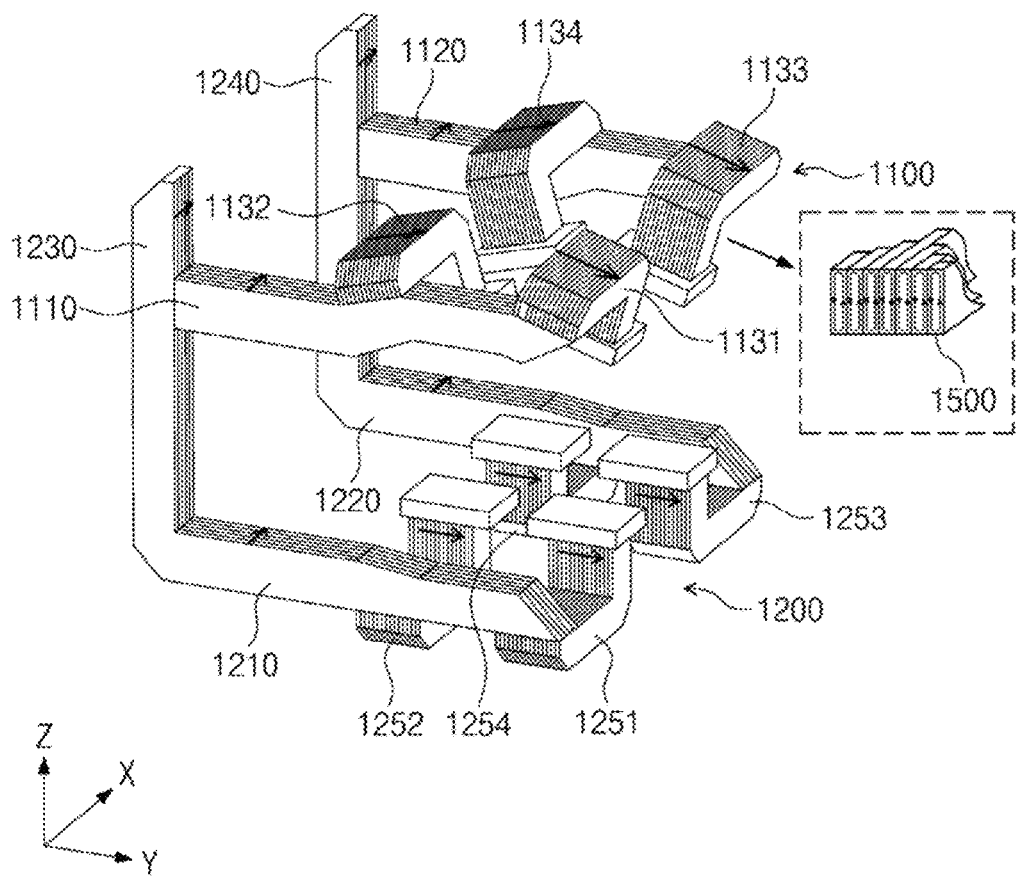
FIG. 25 is a view for explaining a detailed structure of first and second upper yokes, first and second lower yokes, first to fourth upper cores, first to fourth lower cores, and first and second vertical yokes according to the embodiment of the present invention.

FIG. 25 is a view for explaining a detailed structure of first and second upper yokes, first and second lower yokes, first to fourth upper cores, first to fourth lower cores, and first and second vertical yokes according to the embodiment of the present invention.

Referring to FIG. 25, the first and second upper yokes 1110 and 1120 and the first and second lower yokes 1210 and 1220 are provided in which a plurality of electrical steel sheets 1500 having the same length and shape are stacked in the width direction. In addition, the first to fourth upper cores 1131 to 1134 and the first to fourth lower cores 1251 to 1254 are provided in which a plurality of electrical steel sheets 1500 having the same length and shape are stacked in the width direction, and the first and second vertical yokes 1230 and 1240 are provided in which a plurality of electrical steel sheets 1500 having the same length and shape are stacked in the width direction.

When the magnetic drive system 10 generates a high-frequency rotating magnetic field, the electrical steel sheets 1500 prevent eddy currents that may occur inside the above components. Since the electrical steel sheets 1500 are stacked parallel to the direction (arrow direction) of the electric field flowing in each component, the eddy current may be reduced and the magnetic field loss may be minimized.

Figure 26:
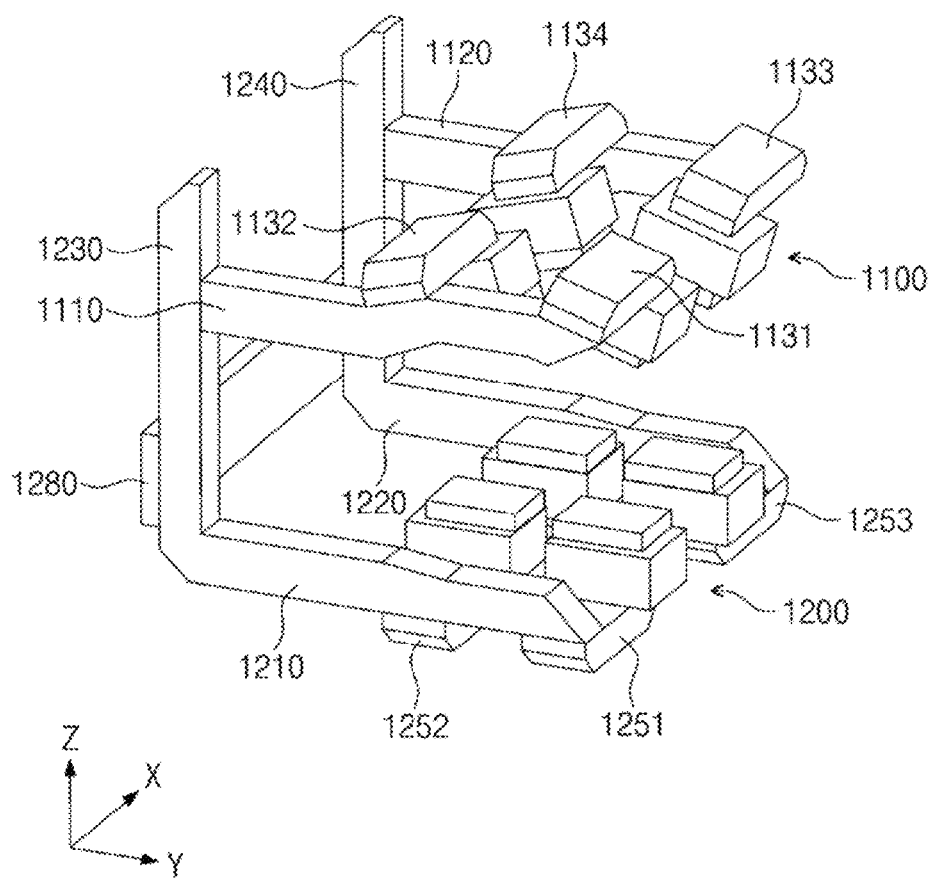
FIG. 26 is a perspective view showing the first and second magnetic field generation units according to another embodiment of the present invention.

FIG. 26 is a perspective view showing the first and second magnetic field generation units according to another embodiment of the present invention.

Referring to FIG. 26, the second magnetic field generation unit 1200 further includes a connecting yoke 1280. The connecting yoke 1280 is formed of a magnetic material, and has a longitudinal direction arranged in the X-axis direction. The connecting yoke 1280 has one end coupled to the first vertical yoke 1230 and the other end coupled to the second vertical yoke 1240. When magnetic fields are generated in the coils 1141 to 1144 and 1261 to 1264, the magnetic field generated from the first vertical yoke 1230 and the magnetic field generated from the second vertical yoke 1240 are connected by the magnetic field generated from the connecting yoke 1280. Accordingly, the magnetic field generated in the operation area T, the magnetic field generated in the first and second upper cores 1131 and 1132, the first upper yoke 1110, the first vertical yoke 1230, the first lower yoke 1210, and the first and second lower cores 1251 and 1252, and the magnetic field generated in the third and fourth upper cores 1133 and 1134, the second upper yoke 1120, the second vertical yoke 1240, the second lower yoke 1220, and the third and fourth lower cores 1253 and 1254 form a closed magnetic circuit.

Figure 27:
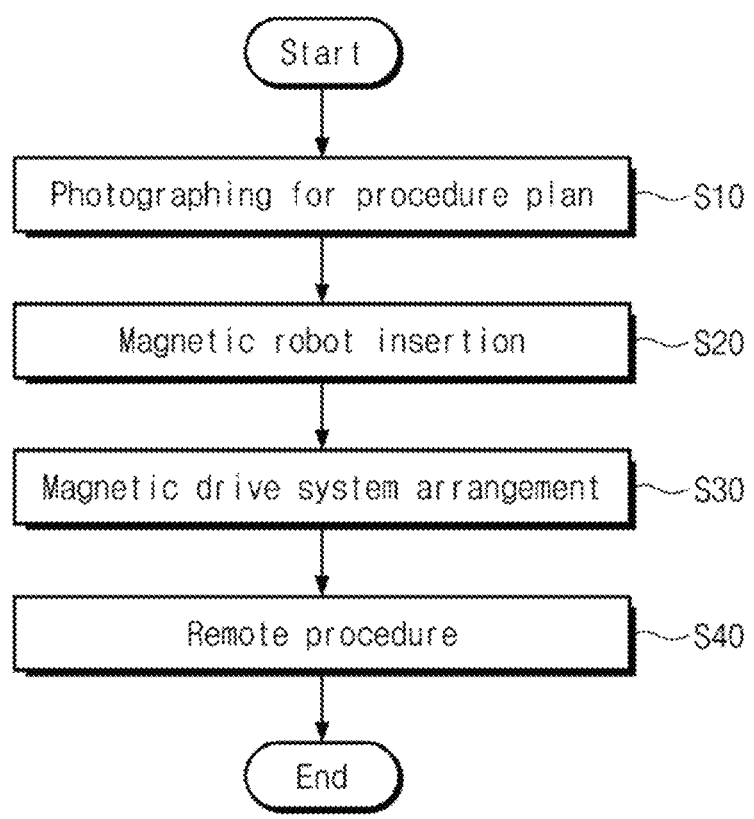
FIG. 27 is a flowchart showing the process of performing a vascular intervention procedure by using the magnetic drive system according to the embodiments of the present invention.

FIG. 27 is a flowchart showing the process of performing a vascular intervention procedure by using the magnetic drive system according to the embodiment of the present invention.

Referring to FIG. 27, the vascular intervention procedure includes: a photographing step for a procedure plan (S10), a magnetic robot insertion step (S20), a magnetic drive system arrangement step (S30), and a remote procedure step (S40).

In the photographing step for a procedure plan (S10), a tomographic or three-dimensional vascular fluoroscopic image is captured through the C-arm image capturing unit, and a route to a lesion to which the magnetic robot may be moved is planned.

In the magnetic robot insertion step (S20), the magnetic robot is inserted into the body using a sheath.

In the magnetic drive system arrangement step (S30), the magnetic drive system (10) is arranged with consideration of the route to the lesion, the position of the magnetic robot, and the arrangement of the C-arm image capturing unit. Specifically, in the magnetic drive system arrangement step (S30), the first magnetic field generation unit 100 and 1100 faces the second magnetic field generation unit 200 and 1200 of the magnetic drive system 10 with an area disposed with the microrobot therebetween. In addition, the operation area T is generated in a space between the first magnetic field generation unit 100 and 1100 and the second magnetic field generation unit 200 and 1200.

In the remote procedure step (S40), the medical staff in a separated space controls the magnetic drive system 10, and performs the procedure through the microrobot. In the remote procedure step (S40), the first magnetic field generation unit 100 and 1100 and the second magnetic field generation unit 200 and 1200 are moved so that the operation area T is moved along the moving path of the microrobot. In the remote procedure step (S40), the first magnetic field generation unit 100 and 1100 and the second magnetic field generation unit 200 and 1200 may be moved so that the center of the operation area T coincides with the position of the microrobot. In the remote procedure step (S40), the first magnetic field generation unit 100 and 1100 and the second magnetic field generation unit 200 and 1200 may be swung and moved on the XY plane parallel to the ground. In the remote procedure step (S40), the first magnetic field generation unit 100 and 1100 and the second magnetic field generation unit 200 and 1200 may be individually moved in the Z-axis direction perpendicular to the ground.

Although the present invention has been described in detail by using exemplary embodiments, the scope of the present invention is not limited to the specific embodiments, and shall be interpreted by the appended claims. In addition, it will be apparent that a person having ordinary skill in the art may carry out various deformations and modifications for the embodiments described as above within the scope without departing from the present invention.

INDUSTRIAL APPLICABILITY

The magnetic drive system according to the present invention may control the movement of the magnetic robot positioned in the human body, so as to be used to treat occlusive blood vessels.

The invention claimed is:

1. A magnetic drive system comprising:
a first magnetic field generation unit;
a second magnetic field generation unit disposed under the first magnetic field generation unit in a Z-axis direction with an operation area interposed therebetween to generate a magnetic field in the operation area in combination with the first magnetic field generation unit; and
a moving module for moving at least one of the first magnetic field generation unit and the second magnetic field generation unit,
wherein the first magnetic field generation unit includes:
a ring-shaped first back yoke formed with an inner space having open upper and lower surfaces;
at least two first cores coupled to the first back yoke, arranged at equal intervals along a circumference of the first back yoke, and inclined at a predetermined angle toward a central axis of the first back yoke; and
a first coil wound on each of the at least two first cores, respectively, and
wherein the second magnetic field generation unit includes:
a ring-shaped second back yoke formed with an inner space having open upper and lower surfaces, and spaced apart from the first back yoke by a predetermined distance to face the first back yoke;
at least two second cores coupled to the second back yoke, arranged at equal intervals along a circumference of the second back yoke, and inclined at a predetermined angle toward a central axis of the second back yoke; and
a second coil wound on each of the at least two second cores, respectively.

2. The magnetic drive system of claim 1, wherein the moving module moves the first magnetic field generation unit and the second magnetic field generation unit so that the central axis of the first back yoke is positioned on a line identical to the central axis of the second back yoke.

3. The magnetic drive system of claim 1, wherein the moving module adjusts a distance between the first back yoke and the second back yoke in a direction of the central axis of the first back yoke and the central axis of the second back yoke.

4. The magnetic drive system of claim 1, wherein the moving module includes:
a body having a support shaft;
a rotating arm coupled to the support shaft and rotatable about the support shaft;
a pair of connecting arms mounted on a front end of the rotating arm, respectively, and rotatable about a first axis;
a first support arm mount on a front end of one of the connecting arms, and rotatable with respect to the connecting arm about a second axis parallel to the first axis to support the first back yoke; and
a second support arm mount on a front end of a remaining one of the connecting arms, and rotatable with respect to the connecting arm about a third axis parallel to the first axis to support the second back yoke.

5. The magnetic drive system of claim 4, wherein the rotating arm includes:
a first area coupled to the support shaft; and
a second area connecting the first area to the connecting arms and rotatable with respect to the first area about the second axis parallel to a longitudinal direction of the rotating arm.

6. The magnetic drive system of claim 1, wherein the first back yoke and the second back yoke have a same outer diameter.

7. The magnetic drive system of claim 1, wherein the first back yoke has an outer diameter greater than an outer diameter of the second back yoke, and one of the first cores has a sectional area larger than a sectional area of one of the second cores.

8. The magnetic drive system of claim 1, further comprising:
a controller that obtains a position information of a target positioned within the operation area, and controls the moving module so that the central axis of the first back yoke and the central axis of the second back yoke are positioned on a same line with the target.

9. A magnetic drive system comprising:
a first magnetic field generation unit;
a second magnetic field generation unit disposed under the first magnetic field generation unit in a Z-axis direction with an operation area interposed therebetween to generate a magnetic field in the operation area in combination with the first magnetic field generation unit; and
a moving module for moving at least one of the first magnetic field generation unit and the second magnetic field generation unit,
wherein the first magnetic field generation unit includes:
a first upper yoke;
a second upper yoke spaced apart from the first upper yoke and positioned at a same height as the first upper yoke;
first and second upper cores spaced apart from each other so as to be coupled to the first upper yoke;
third and fourth upper cores spaced apart from each other so as to be coupled to the second upper yoke; and
an upper coil wound around each of the first to fourth upper cores, respectively, and
wherein the second magnetic field generation unit includes:
a first lower yoke disposed under the first upper yoke in the Z-axis direction;
a second lower yoke disposed under the second upper yoke in the Z-axis direction;
first and second lower cores spaced apart from each other so as to be coupled to the first lower yoke;
third and fourth lower cores spaced apart from each other so as to be coupled to the second upper yoke; and
a lower coil wound around each of the first to fourth lower cores, respectively,
wherein one area of each of the first to fourth upper cores and one area of each of the first to fourth lower cores are arranged toward the operation area,
wherein the first magnetic field generation unit further includes an upper core tip coupled to each front end of the first to fourth upper cores, respectively, and formed of magnetic materials, and
wherein the second magnetic field generation unit further includes a lower core tip coupled to each front end of the first to fourth lower cores, respectively, and formed of magnetic materials.

10. The magnetic drive system of claim 9, wherein, when viewed in the Z-axis direction, edge areas of the upper core tips are positioned on a same line as edge areas of the upper coils, and edge areas of the lower core tips are positioned on a same line as edge areas of the lower coils.

11. The magnetic drive system of claim 9, wherein one area of each of the first to fourth upper cores is arranged toward a center of the operation area.

12. The magnetic drive system of claim 9, wherein the moving module includes:
a vertical moving module for relatively and linearly moving the first upper yoke and the second upper yoke with respect to the first lower yoke and the second lower yoke in the Z-axis direction; and
a horizontal moving module for linearly moving the first upper yoke and the first lower yoke integrally, or for linearly moving the second upper yoke and the second lower yoke integrally, so as to change a distance in a Y-axis direction of the second upper yoke and the second lower yoke with respect to the first upper yoke and the first lower yoke.

13. The magnetic drive system of claim 12, wherein the horizontal moving module linearly moves the first upper yoke and the first lower yoke in an X-axis direction integrally, and linearly moves the second upper yoke and the second lower yoke in the X-axis direction integrally.

14. The magnetic drive system of claim 12, further comprising:
a first vertical yoke having a lower end coupled to a rear end of the first lower yoke and having an upper end positioned at a rear of the first upper yoke; and
a second vertical yoke having a lower end coupled to a rear end of the second lower yoke and having an upper end positioned at a rear of the second upper yoke, wherein
the vertical moving module includes:
a first vertical support shaft positioned at a rear of the first vertical yoke, having a longitudinal direction provided in the Z-axis direction, and provided on at least one surface thereof with a first guide rail;
a second vertical support shaft positioned at a rear of the second vertical yoke, disposed in parallel with the first vertical support shaft, and provided on at least one surface thereof with a second guide rail;
a first yoke support plate movable along the first guide rail, and having a front end coupled to the first upper yoke; and
a second yoke support plate movable along the second guide rail, and having a front end coupled to the second upper yoke.

15. The magnetic drive system of claim 9, wherein each of the first to fourth upper cores and the first to fourth lower cores comprise a plurality of steel sheets stacked in a width direction of each of the upper cores and the lower cores, respectively.

* * * * *